United States Patent
Li et al.

(10) Patent No.: US 12,475,605 B2
(45) Date of Patent: Nov. 18, 2025

(54) SYSTEMS AND METHODS FOR MESH GEOMETRY PREDICTION BASED ON A CENTROID-NORMAL REPRESENTATION

(71) Applicant: Adeia Guides Inc., San Jose, CA (US)

(72) Inventors: Zhu Li, Overland Park, KS (US); Tao Chen, Palo Alto, CA (US)

(73) Assignee: Adeia Guides Inc., San Jose, CA (US)

(*) Notice: Subject to any disclaimer, the term of this patent is extended or adjusted under 35 U.S.C. 154(b) by 167 days.

(21) Appl. No.: 18/203,897

(22) Filed: May 31, 2023

(65) Prior Publication Data

US 2024/0404121 A1  Dec. 5, 2024

(51) Int. Cl.
  G06T 9/00   (2006.01)
  G06T 17/20  (2006.01)

(52) U.S. Cl.
  CPC ............ *G06T 9/002* (2013.01); *G06T 9/001* (2013.01); *G06T 17/205* (2013.01)

(58) Field of Classification Search
  CPC ....... G06T 17/205; G06T 9/001; G06T 9/002; C09D 133/00; C09D 7/43; C08L 2201/54; C08L 33/08; C08L 33/10; C08L 75/04; C08G 18/10; C08G 18/246; C08G 18/4833; C08G 18/4837; C08G 18/62; C08G 18/6245; C08G 18/73; C08G 18/751; C08G 18/755; C08G 18/758; C08G 18/7621; C08G 18/7642; C08G 18/7671; C08G 18/7678; C08G 18/773; C08F 212/08

See application file for complete search history.

(56) References Cited

U.S. PATENT DOCUMENTS

| | | | | |
|---|---|---|---|---|
| 10,034,645 | B1* | 7/2018 | Williams | A61B 5/4064 |
| 2009/0034874 | A1* | 2/2009 | Miller | G06T 15/50 |
| | | | | 382/279 |
| 2016/0045827 | A1* | 2/2016 | Moya | A63F 13/335 |
| | | | | 345/582 |
| 2017/0263043 | A1* | 9/2017 | Peterson | G06T 15/06 |
| 2018/0000441 | A1* | 1/2018 | Wang | G06F 18/214 |
| 2018/0150130 | A1* | 5/2018 | Fowler | G06F 3/011 |
| 2019/0140994 | A1* | 5/2019 | Snider | H04L 51/234 |
| 2019/0279113 | A1* | 9/2019 | Liu | G06N 20/00 |

(Continued)

OTHER PUBLICATIONS

U.S. Appl. No. 17/974,863, filed Oct. 27, 2022, Zhu Li.

(Continued)

*Primary Examiner* — Ming Wu
(74) *Attorney, Agent, or Firm* — HALEY GUILIANO LLP

(57) ABSTRACT

Systems and methods are provided for predictive mesh coding based on a centroid-normal (C-N) representation. An encoder generates C-N representations of a high-resolution (hi-res) mesh and a downscaling of the mesh (lo-res mesh), each representation having respective centroids and normals. The encoder generates predicted centroids corresponding to the hi-res mesh based on the lo-res centroids using a centroid prediction model. The encoder generates predicted normals corresponding to the hi-res mesh based on the predicted centroids and lo-res normals using a normal vector prediction model. Residuals are computed for the respective predicted geometry data. The encoder transmits encodings of the lo-res mesh and the residuals for decoding at a client device.

20 Claims, 11 Drawing Sheets

(56) References Cited

U.S. PATENT DOCUMENTS

2019/0354765 A1* 11/2019 Chan ................. H04N 21/2187
2019/0392267 A1* 12/2019 Tang ................... G06V 30/194

OTHER PUBLICATIONS

"Interactive Iterative Closest Point," Point Cloud Library, https://pcl.readthedocs.io/projects/tutorials/en/latest/interactive_icp_html.
"Minkowski Engine," github, https://nvidia.github.io/MinkowskiEngine/overview.html#sparse-tensor-networks-neural-networks-for spatially-sparse-tenors.
"Optimizing 3D data with Draco Geometry Compression," codelabs, https://codelabs.developers.google.com/codelabs/draco-3d/index.html#/0.
Choy, Christopher, et al., "4D Spatio-Temporal ConvNets: Minkowski Convolutional Neural Networks," IEEE/CVF Conference on Computer Vision and Pattern Recognition. (2019).
Garland, Michael, et al., "Surface Simplification Using Quadric Error Metrics," Carnegie Mellon University, Association for Computing Machinery, Inc. (1997).
Schwarz, Sebastian, et al., "Emerging MPEG Standards for Point Cloud Compression," IEEE JETCAS Special Issue on Immersive Video Coding and Transmission. (2019).
Wang, Jianqiang, et al., "Lossy Point Cloud Geometry Compression via End-to-End Learning," IEEE Transactions on Circuits and Systems for Video Technology, 31, 4909-4923. (2020).
Wang, Jianqiang, et al., "Multiscale Point Cloud Geometry Compression," 2021 Data Compression Conference. (2021).

* cited by examiner

SYSTEMS AND METHODS FOR MESH GEOMETRY PREDICTION BASED ON A CENTROID-NORMAL REPRESENTATION

BACKGROUND

The present disclosure is directed to systems and methods for encoding visual content including extended reality (XR) content. In particular, one or more of the systems and methods described herein provide for predictive intra-coding with a convolutional neural network including mesh geometry prediction based on a centroid-normal representation.

SUMMARY

Advancements in computerized video processing technology have enabled volumetric visual content rendering and reconstruction based on memory-dense 3D data. Such content may be referred to as 4D content in the extended reality (XR) context. Storage of such massive information without compressing is taxing on storage systems and is computationally intensive to achieve high visual fidelity. Transmission of such a large data volume can be bandwidth-demanding and may cause network delays and latency levels that are unacceptable, for example, in XR applications and other immersive media. Accordingly, efficient mesh representation and compression are key technologies for enabling the metaverse vision of immersive interactions with both natural and synthetic content.

In some approaches, 4D content may be represented as mesh objects having a surface partitioned into 2D triangular elements or other types of polygonal elements. Data for a mesh representation of an object may include vertices, connections, and graphical information for each element. However, these approaches to mesh coding (e.g., as in Draco and other mesh coding solutions) may not take advantage of the intrinsic smoothness of the mesh connectivity signal, which limits the effectiveness in mesh prediction schemes for content rendering and reconstruction. For example, vertices of a mesh may be coded using point cloud compression (PCC) techniques. However, the connectivity information is signaled by reference to the vertex data structure. Signaling by reference becomes expensive in transmission and is not effective or efficient for predictive coding schemes, for example, at the computational scales in XR and other immersive media applications.

To help address the aforementioned limitations and other unsatisfactory aspects, systems and methods are described herein for efficiently coding geometry information suitable for predictive 4D content coding, decoding, rendering, and reconstruction. One or more of the described systems and methods may include applying neural network techniques (e.g., using a convolutional neural network) for predicting centroid-normal representations to capture cross scale dependency of smooth signals in cross scale intra-prediction and mesh coding. In some aspects, a predictive coding framework is described herein. Such a framework may be partially or wholly implemented in a content encoder. Although reference may be made to an encoder herein for illustrative purposes, it is appreciated that the predictive coding framework as described is not intended to be limited to such a system and may include various components as follows.

As described, the encoder may include hardware, software, firmware, and/or any combinations of components thereof, where any of the involved systems may perform one or more of actions of the described techniques without departing from the teachings of the present disclosure. Some non-limiting examples are described as follows. For example, a content encoder may include a locally hosted application at user equipment (e.g., user device). For example, a content encoder may include a remote application hosted at a server communicatively coupled to one or more content delivery systems, where the content encoder provides instructions that are transmitted to the systems and executed by the relevant subsystems (e.g., at edge servers, etc.) along the transmission path to the transmitted content's destination. For example, a content encoder may include a subsystem integrated with the local client systems. For example, a content encoder may include a local application at the client-side systems and a remote system communicatively coupled thereto.

In some embodiments, an encoder accesses a data structure comprising a high-resolution (hi-res) mesh or mesh object representing 3D media content (e.g., 3D objects in 4D content). The encoder may generate a low-resolution (lo-res) mesh from the hi-res mesh. The encoder generates respective first and second centroid-normal (C-N) representations of the hi-res and lo-res mesh. The C-N representations have respective pluralities of centroids and respective pluralities of normal vectors. For example, a C-N representation may have respective first, second, and third spatial coordinates corresponding to a centroid of each mesh element and respective first and second angles corresponding to a normal vector that is perpendicular to each mesh element at the respective centroid. The encoder uses a centroid occupancy prediction model and the lo-res mesh to generate a predicted representation corresponding to the first C-N representation of the hi-res mesh. The encoder uses a normal vector prediction model with the predicted representation and the lo-res mesh to generate predicted normal vectors corresponding to the first C-N representation.

The encoder computes a centroid and normal vector residual based on associated errors between the predicted representation and the first C-N representation of the hi-res mesh. For example, the predicted representation may comprise a point cloud of predicted centroids corresponding to the first plurality of centroids of the first C-N representation. In this example, the centroid residual may be determined based on one or more differences (e.g., computed by subtraction) between the predicted centroids and the first plurality of centroids. In a second non-limiting example, the encoder may determine the centroid residual based on a cross-entropy loss metric from the centroid occupancy prediction model.

As an illustrative example, the encoder may determine the normal vector residual based on a cross-entropy loss metric from the normal vector prediction model. In this example, a vector direction for a normal vector may be collectively defined by two angular parameters ($\alpha$, $\beta$) as projected on a unit sphere. In some aspects, the normal vector prediction model may have been trained to predict each angular parameter as a graphic attribute (e.g., color attributes of a point cloud). The encoder may determine the normal vector residual based on the cross-entropy loss metric from the normal vector prediction model, which may be unavailable in other approaches (e.g., connectivity signaling by reference).

The encoder outputs the second C-N representation corresponding to the lo-res mesh, the centroid residual, and the normal vector residual for content rendering and reconstruction. For example, the encoder may generate and transmit encoded bitstreams of the output data to an XR engine (e.g., at a virtual environment server, a VR head-mounted display (HMD), etc.) for further processing. In some embodiments, the XR engine decodes the bitstreams, reconstructs the hi-res mesh, and generates for display the 3D media content.

In some embodiments, a predictive coding framework is extended to accommodate an adaptive streaming use case. For example, a content encoder may code multiple visual quality levels and bitrates of mesh representations corresponding to the same content item. The streams may be delivered adaptively in one or more client/server-based embodiments, depending on bandwidth available to a receiving device, bandwidth available to each of a plurality of receiving devices, and/or a collective bandwidth available for a plurality of receiving devices in one or more Internet-of-Things (IoT) environments. For example, an encoder in a content delivery network may adaptively deliver a content stream to a smart home hub coupling a plurality of IoT devices.

In some embodiments, the multiresolution representations are applicable to progressive mesh reconstruction and/or other adaptive rendering techniques when bandwidth is limited. A bitstream representing the low-resolution mesh (e.g., from a mesh simplifier) may be delivered first for fast decoding and rendering at a client device. A client-side decoder, via a predictive coding framework, reconstructs a high-resolution mesh when the bitstreams of the centroid and normal vector residuals are delivered to the client device.

As a result of the systems and methods described in the present disclosure, 4D content may be efficiently coded for storage, transmission, rendering, and/or reconstruction, leading to improvements upon other approaches towards XR and other immersive media applications. In some embodiments, the predictive coding framework provides a prediction-across-scale framework for mesh geometry coding. In some advantageous aspects, one or more of the systems and methods for the predictive coding framework described herein enable an intra-coding scheme via predictive centroid-normal representations using a centroid super-resolving prediction model and a normal super-resolving prediction model. The predictive coding framework may provide multi-scale predictions of centroid occupancy and normal vector parameters. Such an intra-coding scheme across multiple resolution scales may leverage cross-entropy loss techniques (e.g., binary cross-entropy (BCE) loss, log loss, etc.) based on the predictive models to signal residuals in a predicted centroid-normal representation, enabling efficient residual coding and associated lossless compression techniques.

Furthermore, the data volume is advantageously reduced since high fidelity may be achieved from a lo-res mesh and the residuals. For example, a high-resolution mesh has a large data volume, which can be taxing on bandwidth demand, processing time, and occupied memory in XR systems (e.g., metaverse-based applications). Transmitting a lower resolution version of the high-resolution mesh may lose high visual fidelity information and introduce visual distortion. In one or more of the described approaches of the present disclosure, an encoding system transmits encodings of a low-resolution C-N model and associated residuals, which may have an overall lower data volume. Further, the data of the C-N model and associated residuals may be analogous to point cloud data, resulting in a high lossless compression ratio. A high-resolution mesh can be reconstructed from the encodings via the predictive coding framework. Thus, bandwidth demand, processing time, and occupied memory are reduced for the involved systems and devices compared to other approaches.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
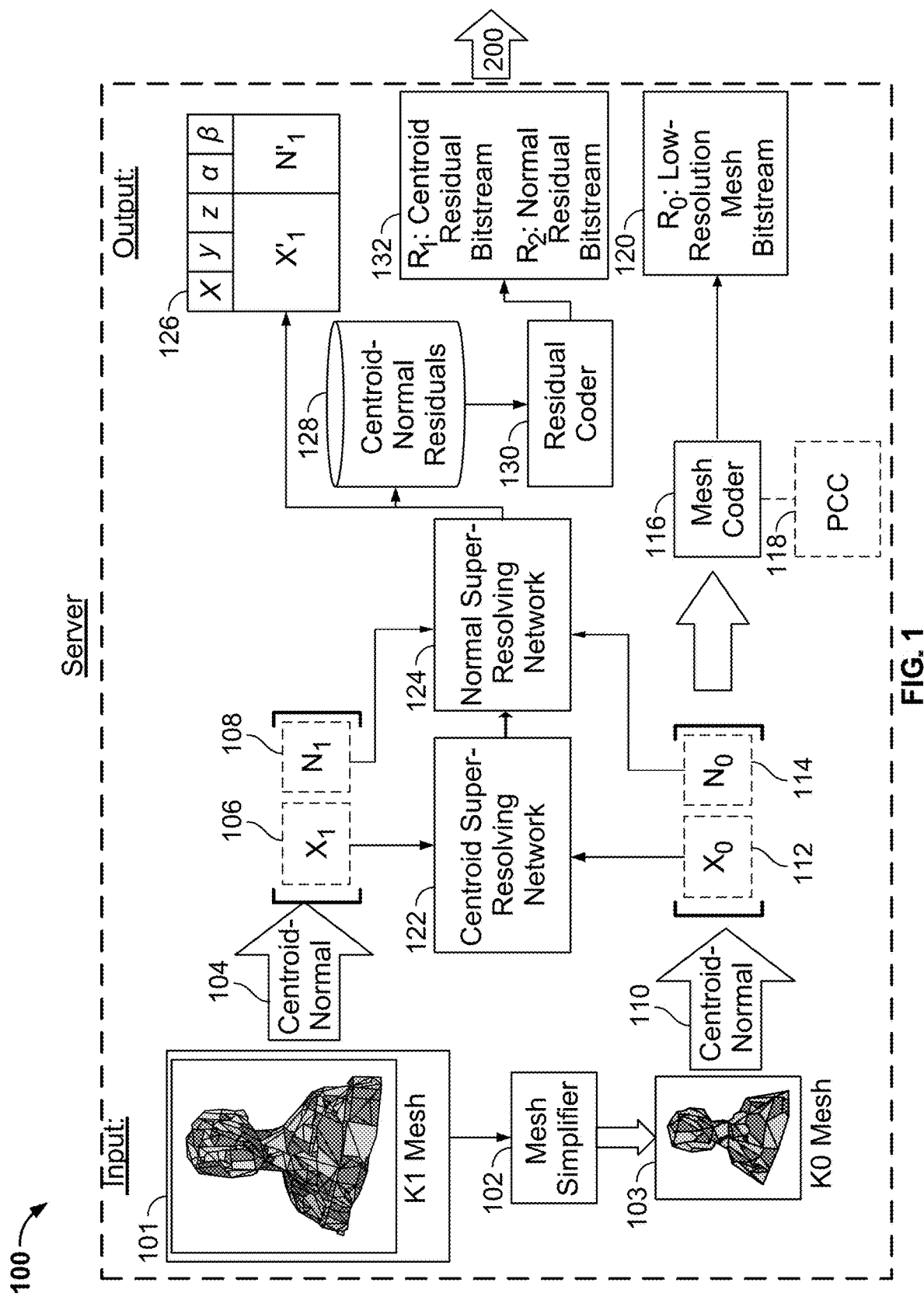
FIG. 1 shows an illustrative example of a predictive coding system, in accordance with some embodiments of this disclosure.

As referred to herein, the term "content" should be understood to mean an electronically consumable asset accessed using any suitable electronic platform, such as broadcast television programming, pay-per-view programs, on-demand programs (as in video-on-demand (VOD) systems), Internet content (e.g., streaming content, downloadable content, Webcasts, etc.), video clips, audio, information about content, images, animations, documents, playlists, websites and webpages, articles, books, electronic books, blogs, chat sessions, social media, software applications, games, virtual reality media, augmented reality media, 3D modeling data (e.g., captured via 3D scanning, etc.), and/or any other media or multimedia and/or any combination thereof. In particular, extended reality (XR) content refers to augmented reality (AR) content, virtual reality (VR) content, mixed reality (MR) content, hybrid content, and/or other digital content combined with or to mirror the physical world objects including interactions with such content.

As referred to herein, compression and/or encoding of media content may be understood as any suitable combination of hardware and/or software configured to perform bit reduction techniques on digital bits of the media content in order to reduce the amount of data required to transmit and/or store the media content. Such techniques may reduce the bandwidth or network resources required to transmit the media content over a network or other suitable wireless or wired communication medium and/or enable bitrate savings with respect to downloading or uploading the media content. Such techniques may encode the media content such that the encoded media content may be represented with fewer digital bits than the original representation while minimizing the impact of the encoding or compression on the visual quality of the media content. In some embodiments, parts of encoding the media content may include employing a hybrid video coder such as, for example, the High Efficiency Video Coding (HEVC) H.265 standard, the Versatile Video Coding (VVC) H.266 standard, the H.264 standard, the H.263 standard, MPEG-4, MPEG-2, or any other suitable codec or standard, or any combination thereof.

Although described in the context of XR applications and/or encoding of such content herein, it is noted and appreciated that the systems and techniques described herein are intended to be non-limiting and may be applicable within other contexts. For example, a mesh refers to a representation of an object's surface partitioned into polygon-based elements (e.g., triangles, quadrilaterals, other polygons) and is widely applicable in representing photo-realistic 3D graphics and other computer geometries. Some example applications include visual effects (VFX), artificially generated graphics (e.g., computer-generated imagery), gaming, photogrammetry, videogrammetry, etc. A predictive coding framework described herein may be employed for graphics processing involving such meshes. Although one or more of the systems and techniques are described herein with respect to unstructured triangle meshes, it is contemplated that other formats of volumetric data may be included without departing from the teachings of the present disclosure. The examples described herein are illustrative, and the described systems and techniques may be extended to include various situations.

As referred to herein, the term "centroid" should be understood to mean a geometric center of an object including a 2D object (e.g., a triangle, hexagon, etc.) and/or a 3D object (e.g., a cube, sphere, an artificially generated model, etc.). A centroid is the arithmetic mean position of a plurality of points in a surface of the object and may be extended to any number of spatial dimensions. For example, a centroid may be determined based on an arithmetic mean of vertices of a polygon. In some instances, a centroid may be located on an object's surface. In some instances, a centroid may be located within an object's volume. In some instances, a centroid may be located outside an object's volume.

As referred to herein, the term "normal vector" should be understood to mean a vector that is perpendicular to an object at a point of the object. In the present disclosure, a normal vector may refer to a surface normal that is located at a point on the surface of a 3D object. In some instances, a normal vector may have a direction towards the exterior of the object or the interior of the object. A normal vector may be referred to as a "normal." A unit normal vector (or "unit normal") is a normal vector having a length of one unit.

FIG. 1 shows an illustrative example of a predictive coding system 100, in accordance with some embodiments of this disclosure. The system 100 may be implemented partially or wholly on one or more system components including a content encoder. For example, the system 100 may be implemented at a server in some client/server-based embodiments. The system 100 comprises a mesh simplifier 102, a C-N generator for generating C-N representations 104 and 110, a mesh coder 116 comprising a PCC module 118 (e.g., using graph-based PCC (GPCC)), a centroid super-resolving (CSR) network 122, a normal super-resolving (NSR) network 124, and a residual coder 130.

The system 100 receives a hi-res mesh 101 (labeled K1 mesh). At the system 100, a lo-res mesh 103 (labeled K0 mesh) is generated using a mesh simplifier 102 based on a hi-res mesh 101. Meshes 101 and 103 represent the same media content (e.g., a 3D scanned model of a person, one or more video frames, an intra-segment, etc.). The system 100 generates first and second C-N representations 104 and 110 having respective centroids 106, 112 (respectively labeled $X_1$, $X_0$) and respective normal vectors 108, 114 (respectively labeled $N_1$, $N_0$). The centroids 112 and the normal vectors 114 may be coded via the mesh coder 116 to generate an encoding 120 of the C-N representation 110 and/or the lo-res mesh 103. In some embodiments, the system 100 generates a lo-res mesh bitstream (labeled $R_0$) of the encoding 120 of the C-N representation 110 and/or the lo-res mesh 103.

Centroids 106, 112 are inputted to the CSR network 122. The CSR network 122 outputs predicted centroids (e.g., centroids labeled $X'_1$) and associated centroid residuals to the NSR network 124. Additionally, or alternatively, the system 100 may input the centroids 106 to the NSR network 124. The normal vectors 108, 114 are inputted to the NSR network 124. The NSR network 124, based on the input data, generates predicted normal vectors (e.g., normals labeled $N'_1$) at the centroids 106 and associated normal vector residuals. The system 100, via the NSR network 124, generates (i) a data structure 126 comprising the predicted centroids $X'_1$ and predicted normal vectors $N'_1$ and (ii) a data structure 128 comprising the centroid residuals and the normal residuals. The data structure 128 is inputted to a residual coder 130 to generate encodings 132. In some embodiments, the system 100 generates a centroid residual bitstream (labeled $R_1$) and a normal vector residual bitstream (labeled $R_2$). The system 100 transmits the encodings 120, 132 and/or the data structure 126 for reconstructing and generating the media content for display at one or more devices.

The system 100 accesses or receives the high-resolution mesh 101 as input. In some embodiments, a lo-res mesh 103 is separately inputted to the system 100. The mesh simplifier 102 may apply one or more mesh simplification or adaptive refinement techniques. In some aspects, mesh simplification can generate a low-resolution mesh with fewer mesh elements (e.g., triangles or other polygons) than an initial high-resolution mesh to preserve the geometric information with a low bit rate. For example, a bitstream generated from a low-resolution mesh may be transmitted at a low bit rate (e.g., a lower bit rate than a bitstream generated from an initial high-resolution mesh). An example algorithm for mesh simplification is described by Garland, Michael, and Paul S. Heckbert. "Simplifying surfaces with color and texture using quadric error metrics." Proceedings Visualization'98 (Cat. No. 98CB36276). IEEE, 1998, which is hereby incorporated by reference herein in its entirety.

As an illustrative example, the hi-res mesh 101 may be a triangle mesh represented by 4570 triangles, and the lo-res mesh 103 outputted by the mesh simplifier 102 may be a triangle mesh represented by 1270 triangles. In some embodiments, the hi-res mesh 101 and the lo-res mesh 103 may include elements of different polygon types. For example, the hi-res mesh 101 may be represented by over 5000 hexagons, and the mesh simplifier 102 outputs a lo-res mesh 103 of 1309 triangles. As a second example, the hi-res mesh 101 may be represented by 8192 quadrilaterals, and the mesh simplifier 102 outputs a lo-res mesh 103 having 256 hexagons. The examples are intended to be illustrative, and it is noted that the meshes may be generated, refined, and/or simplified using various techniques and/or combinations thereof without departing from the teachings of the present disclosure.

An input to the system 100 is a hi-res mesh 101 having a first number of mesh elements (denoted K1). The lo-res mesh 103 has a second number of mesh elements (denoted K0), where K0 is less than K1. Both meshes 101 and 103 represent the same media content with the mesh 101 having a greater visual resolution level than the mesh 103 for the same media content. The lo-res mesh 103 may have a downscaled resolution based on the hi-res mesh 101 via the mesh simplifier 102. For example, the mesh 101 may have a lower visual distortion metric than the mesh 103. For example, if the media content includes a 3D model, the mesh 101 may have a higher fidelity metric compared to the 3D model than the mesh 103 (e.g., based on Hausdorff distance, local curvatures, etc.). At the system 100, the hi-res mesh 101 is simplified by the mesh simplifier 102 to generate the lo-res mesh 103. The hi-res mesh 101 and lo-res mesh 103 are transformed to respective C-N representations 104 and 110 (e.g., labeled Centroid-Normal). The C-N representations 104 and 110 may be generated using a C-N generator based on meshes 101 and 103. The C-N representation 104 comprises first centroids 106 and first normal vectors 108. The C-N representation 110 comprises second centroids 112 and second normal vectors 114.

In some embodiments, the system 100 generates a C-N representation based on transforming the vertices and connectivity information of a mesh object to a C-N representation. For each mesh element of a mesh object, the system 100 determines, based on the vertices and/or connectivity between vertices, a centroid of the mesh element and a normal vector that is perpendicular to the mesh element at the centroid.

As an illustrative, non-limiting example of a C-N transform, the system 100 receives a data structure comprising a mesh of triangular elements (i.e., three vertices and three connections for each mesh element) of the hi-res mesh 101. The system 100 accesses, from the data structure, a triangular element having vertices ($v_1$, $v_2$, $v_3$). Each vertex has an associated spatial coordinate. The connections may be signaled as indices to the vertices (e.g., $v_1$ to $v_3$). The system 100 determines a centroid $x_c$, for example, by averaging the spatial coordinates of the vertices as follows:

$$x_c = \frac{(v_1 + v_2 + v_3)}{3}$$

A normal vector may be computed based on the vertices and/or connectivity information (e.g., as a cross product between any two sides having a common vertex), resulting in vector components ($n_x$, $n_y$, $n_z$). In some embodiments, computing a normal vector (e.g., based on a plurality of vertices of a mesh element) comprises determining a first angle and a second angle (e.g., $\alpha$ and $\beta$) corresponding to the normal vector. The first angle and the second angle collectively define a spatial direction (e.g., in spherical coordinates) that is perpendicular to the mesh element at the centroid. A normal vector with components ($n_x$, $n_y$, $n_z$) may be computed as being on a sphere of radius r having a center at $x_c$ by solving the following equations for ($\alpha$, $\beta$):

$$n_x = r\sin(\alpha)\cos(\beta) \quad n_y = r\sin(\alpha)\sin(\beta) \quad n_z = r\cos(\alpha)$$

Since ($\alpha$, $\beta$) are sufficient to indicate an associated spatial direction perpendicular to the triangular element (e.g., compute a unit normal), the system 100 stores ($\alpha$, $\beta$) for each normal vector instead of ($n_x$, $n_y$, $n_z$) in some embodiments, resulting in a reduced storage amount of one value per mesh element. In some embodiments, the system 100 generates a data structure comprising spatial coordinates for each centroid and angle parameters for each normal vector that are computed based on respective pluralities of vertices and/or connections of each mesh element of a plurality of mesh elements. For example, the system 100 may store, in memory, five values associated with each mesh element (three spatial coordinates for a centroid and two angles for a normal vector) as part of a C-N representation. Thus, in some aspects, the plurality of centroids for a mesh object may be processed as a point cloud using the related systems and techniques (e.g., coding, compression, registration, reconstruction, multi-sampling, etc.). It is contemplated that various techniques may be applied for determining the centroid and normal vector of a mesh element without departing from the teachings of the present disclosure. An example inverse C-N transform is described regarding FIG. 2.

The system 100 generates an encoding of the second C-N representation. As an example, the system 100 may input the second C-N representation to a mesh coder 116. In some embodiments, the mesh coder 116 comprises a PCC module 118 for coding the second centroids 112 using one or more point cloud coding and/or compression techniques. The mesh coder 116 outputs the encoding 120 corresponding to the lo-res mesh 103. The encoding 120 may comprise the second C-N representation. Additionally, or alternatively, the mesh coder 116 may output a bitstream of the encoding 120 of the lo-res mesh 103 (e.g., the mesh elements). The lo-res mesh bitstream may comprise the mesh geometry information (e.g., mesh elements, centroids, normal, etc.) of the lo-res mesh 103. In some instances, encoding the second C-N representation may be advantageous for a predictive coding framework described herein. For example, values of the second centroids 112 may be quantized into N-bit (e.g., 8-bit, 10-bit, 24-bit, etc.) representations, and values of the second normal vectors 114 may be quantized into N-bit (e.g., 8-bit, 10-bit, 24-bit, etc.) representations. In some embodiments, the values of the second centroids 112 may be represented with a different number of bits (e.g., 12-bit) than the values of the second normal vectors 114 (e.g., 16-bit). For example, the mesh coder 116 may use a mesh geometry coding tool to generate the encoding 120. An example mesh geometry coding tool may include Draco (e.g., as described in Google GitHub, Draco 3D Data Compression, accessed on Jun. 14, 2022, which is hereby incorporated by reference herein in its entirety).

To recover a high visual fidelity representation (e.g., the hi-res mesh 101) from a low visual fidelity representation (e.g., the lo-res mesh 103), a prediction model is trained to determine the properties of a mesh geometry based on a lo-res mesh. The prediction model may be trained by inputting a high-resolution mesh and a corresponding simplified mesh. In some embodiments, the prediction model comprises two neural networks, a prediction network trained for predicting centroids (e.g., a centroid occupancy prediction model) and a prediction network trained for predicting normal vectors (e.g., a normal vector prediction model). Referring to FIG. 1, the CSR network 122 may comprise the centroid prediction model, and the NSR network 124 may comprise the normal vector prediction model.

In some embodiments, the CSR network 122 comprises a 3D convolutional neural network that is trained according to a first learning algorithm. For example, the CSR network 122 may comprise a sparse neural network. For example, the CSR network 122 may comprise groups of multi-resolution convolution blocks (MRCBs), upscaling layers, and/or downscaling layers. For example, the CSR network 122 may have been trained by adjusting weights until the centroid prediction model provides output hi-res centroid information from lo-res centroid information with a sufficient degree of correctness as compared to the first C-N representation. In some embodiments, the system 100 inputs a plurality of hi-res C-N representations and corresponding lo-res C-N representations (e.g., simplified versions of the hi-res C-N representations) for training the CSR network 122. In some aspects, the CSR network 122, via the first learning algorithm, may be trained to generate a super-resolved model comprising hi-res centroids based on lo-res centroids (e.g., an upscaled point cloud model) and to determine associated centroid errors. In some embodiments, the CSR network 122 is trained based on a plurality of downsampled versions of the hi-res centroids, each version being at a lower resolution scale than the hi-res centroids and different from other versions. For example, the system 100 may input the centroids 106, 112 to the CSR network 122 as part of the first learning algorithm to generate a predicted representation having a plurality of predicted centroids and associated centroid errors corresponding to the first C-N representation of the hi-res mesh 101. Centroid residuals may be generated based on the differences between the predicted centroids $X'_1$ and the centroids 106. The centroid residuals may be quantized and coded as a centroid residual bitstream as part of encodings 132 (e.g., via binary arithmetic coding or other coding schemes).

In some embodiments, the system 100 generates reconstructed centroids of the C-N representation 104. The reconstructed centroids of the C-N representation 104 may be a sum of the centroid residuals (e.g., centroid errors) and the predicted centroids $X'_1$ corresponding to the C-N representation 104 (e.g., correcting/compensating for the centroid errors by adding a centroid error to a predicted centroid of $X'_1$ to reconstruct a corresponding centroid of $X_1$ of the C-N representation 104). In some embodiments, the system 100 may generate reconstructed centroids that are within a tolerance range of the centroids 106. For example, the system 100 may generate reconstructed centroids based on the sum of the centroid residuals and the predicted centroids such that the centroid error is less than 1%. As an illustrative non-limiting example, the system 100 may determine one or more statistical metrics (e.g., median, mean, standard deviation, variance, etc.) based on centroid errors. The statistical metric(s) may indicate that the predicted centroids have errors within a range of 10%. Based on the one or more statistical metrics, the system 100 computes a residual compensation factor that reduces the centroid errors. The residual compensation factor may include a coordinate shift, a rotation, scaling, or another modification for one or more predicted centroids. The system 100 may modify the predicted centroids based on the residual compensation factor to generate the reconstructed centroids having reduced centroid errors (e.g., reconstructed centroids having errors within a tolerance range of 1%). In one or more aspects, the reconstructed centroids may be treated the same as the centroids 106 for predicting a hi-res C-N representation.

In some embodiments, the CSR network 122 predicts a probability of occupancy of centroids in a mesh object (e.g., mesh object cube). For example, the mesh object may be a 3D structure defining one or more potential centroids based on a C-N representation of a hi-res polygon mesh. For example, the 3D structure may be a table, where each entry in the table represents a potential centroid. If an entry in the table for (x,y,z) (e.g., (15, 15, 15)) is "1," then there is a centroid. If an entry in the table for (x,y,z) (e.g., (15, 15, 15)) is "0," then there is no centroid. The centroid prediction may be achieved via a multi-resolution 3D occupancy learning network that is described regarding FIG. 4.

The input to the CSR network 122 includes the centroids of a reconstructed C-N representation of the lo-res mesh 103 (e.g., as an output mesh from a decoder). The output of the CSR network 122 may be an occupancy probability for the centroids in a mesh object cube (e.g., a larger number of centroids). For example, the input to the CSR network 122 may be a list of $N_o$ centroids (e.g., $N_o$=3000, or some other number of points). Each centroid may be represented by coordinates (x,y,z) (e.g., a matrix of size $N_o \times 3$). The output of the CSR network 122 may be an occupancy probability computed for each centroid of a mesh object cube having a much larger number of N centroids (e.g., a matrix of size N×1). As an example, the mesh object cube may be of size 10-bit, corresponding to $N=(2^{10})^3$, or 1,073,741,824 centroids. The CSR network 122 may predict a probability of occupancy of each centroid in the mesh object cube. The occupancy probability can be used to identify which centroids in the mesh object cube are included for a C-N representation of the hi-res mesh 101. In this manner, the CSR network 122 can be used to generate, from a C-N representation of a lo-res mesh, predicted centroids of a C-N representation of a hi-res mesh. In some embodiments, the system 100 inputs the centroids of a lo-res C-N representation (e.g., a transformed mesh having 1024 elements) to the CSR network 122 to approximate centroids of a hi-res C-N representation (e.g., a transformed mesh having 8192 elements).

In some embodiments, the CSR network 122 compares the probability of occupancy of centroids to a threshold value (e.g., to indicate occupancy of a centroid). If a probability of occupancy is greater than the threshold value, the CSR network 122 includes the corresponding centroid in the predicted centroids for the hi-res mesh 101 (e.g., entry of the corresponding centroid is "1"). If the probability of occupancy is less than or equal to the threshold value, the CSR network 122 does not include the corresponding centroid in the predicted centroids for the hi-res mesh 101 (e.g., entry of the corresponding centroid is "0"). In some embodiments, the corresponding centroid is included if the probability of occupancy of centroids is greater than or equal to a threshold value and not included if the probability of occupancy is less than the threshold value. The CSR network 122 may output a centroid occupancy matrix of N×1. The centroid occupancy matrix of N×1 may be represented by a list of N' centroids, with each centroid in the list represented by coordinates (x,y,z) (e.g., a matrix of size N'×3). Each centroid in the list of N' centroids represents a corresponding occupied centroid in the mesh object cube (e.g., entry of the corresponding centroid is "1" in the centroid occupancy matrix of N×1). The CSR network 122 determines a difference between the predicted centroids corresponding to a target hi-res mesh and the centroids of the target hi-res mesh. For example, the CSR network 122 may subtract the occupancy matrix representing the predicted centroids corresponding to the C-N representation 104 from the occupancy matrix representing the centroids 106 of the C-N representation 104, resulting in the centroid residual.

The system 100 computes a centroid residual based on the associated errors between a predicted representation and the C-N representation 104 of the hi-res mesh. For example, the predicted representation may comprise a point cloud of predicted centroids corresponding to the centroids 106 of the C-N representation 104. In this example, the centroid residual may be computed by subtraction between the predicted centroids and the centroids 106. In a second non-limiting example, the system 100 may determine the centroid residual based on a loss metric (e.g., cross-entropy, log loss, etc.) from the centroid occupancy prediction model. In some aspects, the loss metric indicates a difference between probability distributions for determining whether an occupancy state (e.g., an entry of "1") matches a true value in the prediction model. For example, the CSR network 122 may determine a BCE loss metric for each entry of the occupancy matrix. The BCE loss metric signals a difference between the predicted states. The NSR network 124 may determine the normal vector residuals based on the BCE loss metric. The normal vector residuals may be coded, for example, as the bitstream R2 of the encodings 132.

In some embodiments, the CSR network 122 is trained according to a first learning algorithm, for example, by adjusting weights until the centroid occupancy prediction model begins predicting output high-resolution centroid information based on low-resolution centroid information with a sufficient degree of correctness. The weights adjusted by the first learning algorithm may be weights of the centroid occupancy prediction model (e.g., weights of a neural network) used to predict output of high-resolution centroid information from the low-resolution centroid information. Correctness may be based on ground truth high-resolution centroid information. For example, a sufficient degree of correctness may be when the centroid occupancy prediction network outputs predicted high-resolution centroid information that is close (e.g., within a suitable tolerance, such as within 1% accuracy) to the ground truth high-resolution centroid information from an input of ground-truth low-resolution centroid information.

In some embodiments, the data structures for centroids of a mesh comprise a centroid occupancy matrix or a list of centroid coordinates. In some embodiments, the system 100 accesses, modifies, and stores the aforementioned data structures as appropriate (e.g., internally within components of the system 100, including a block to change the C-N representation). For example, the output of CSR network 122 may be a centroid occupancy matrix of size N×1. The input to the NSR network 124 may be a list of centroids of size N'×3. In this example, the system 100 may include a block between the CSR network 122 and the NSR network 124 to convert the centroid occupancy matrix to a list of centroids having the appropriate size.

The system 100 uses a normal vector prediction model with the predicted representation and the lo-res mesh (e.g., by inputting the normal vectors 114 and centroids 106 into the NSR network 124) to generate predicted normal vectors corresponding to the C-N representation 104. In some embodiments, the normal vectors 108, 114 are normalized to generate respective unit normal vectors having a spatial direction defined by two angle parameters (i.e., α, β) and a vector length of one unit. The direction of a normal vector would be perpendicular to a corresponding mesh element at the centroid of the mesh element (e.g., of the hi-res mesh 101). As an illustrative example, the first and second angles α, β may respectively refer to inclination and azimuth as defined in a spherical coordinate system. It is noted and appreciated that other coordinate systems and corresponding parameters may be employed without departing from the teachings in the present disclosure.

In this example, each normal vector has a tail end starting at a centroid, and the vector direction may be defined by two angular parameters (α, β) on a unit sphere having a center at the centroid's position. The normal vector prediction model may have been trained to predict each angular parameter as a graphic attribute (e.g., a color attribute for a point of a point cloud). In this manner, the system 100 may apply a loss metric (e.g., cross-entropy loss) from the normal vector prediction model to determine the normal vector residual, which advantageously signals the residual from the predictive model that may be unavailable in other approaches (e.g., connectivity signaling by reference).

In some embodiments, the NSR network 124 comprises a 3D convolutional neural network that is trained according to a second learning algorithm. For example, the NSR network 124 may comprise a sparse neural network. The CSR network 122 may generate predicted centroids and associated centroid residuals as input for the NSR network 124. The NSR network 124 may generate predicted normal vectors at the input centroids and an associated normal vector residual. The networks 122, 124 are respectively described in detail regarding FIGS. 4-5.

The NSR network 124 may be used to generate predicted normal vectors for a high-resolution mesh based on the centroids of the mesh. The NSR network 124 may be trained according to a second learning algorithm. For example, the NSR network 124 may have been trained by adjusting weights until the normal vector prediction model provides output hi-res normal vector information (e.g., first and second angles α, β) from lo-res centroid and associated normal vector information with a sufficient degree of correctness as compared to the first C-N representation. In some aspects, the NSR network 124, via the second learning algorithm, may be trained to generate a super-resolved model comprising normal vectors at hi-res centroids (e.g., normal vectors of an upscaled point cloud model) and to determine associated normal vector errors (e.g., an error for each predicted angle of the normal vector). The NSR network 124 may be based on a similar predictive model as the CSR network 122 (e.g., same front-end architecture and different tail-end architecture with different loss function). The centroids or the target coordinates for the predicted normal vectors are inputted at different resolution scales in the NSR network 124 to enhance the predictive model as described regarding FIG. 5.

Figure 5:
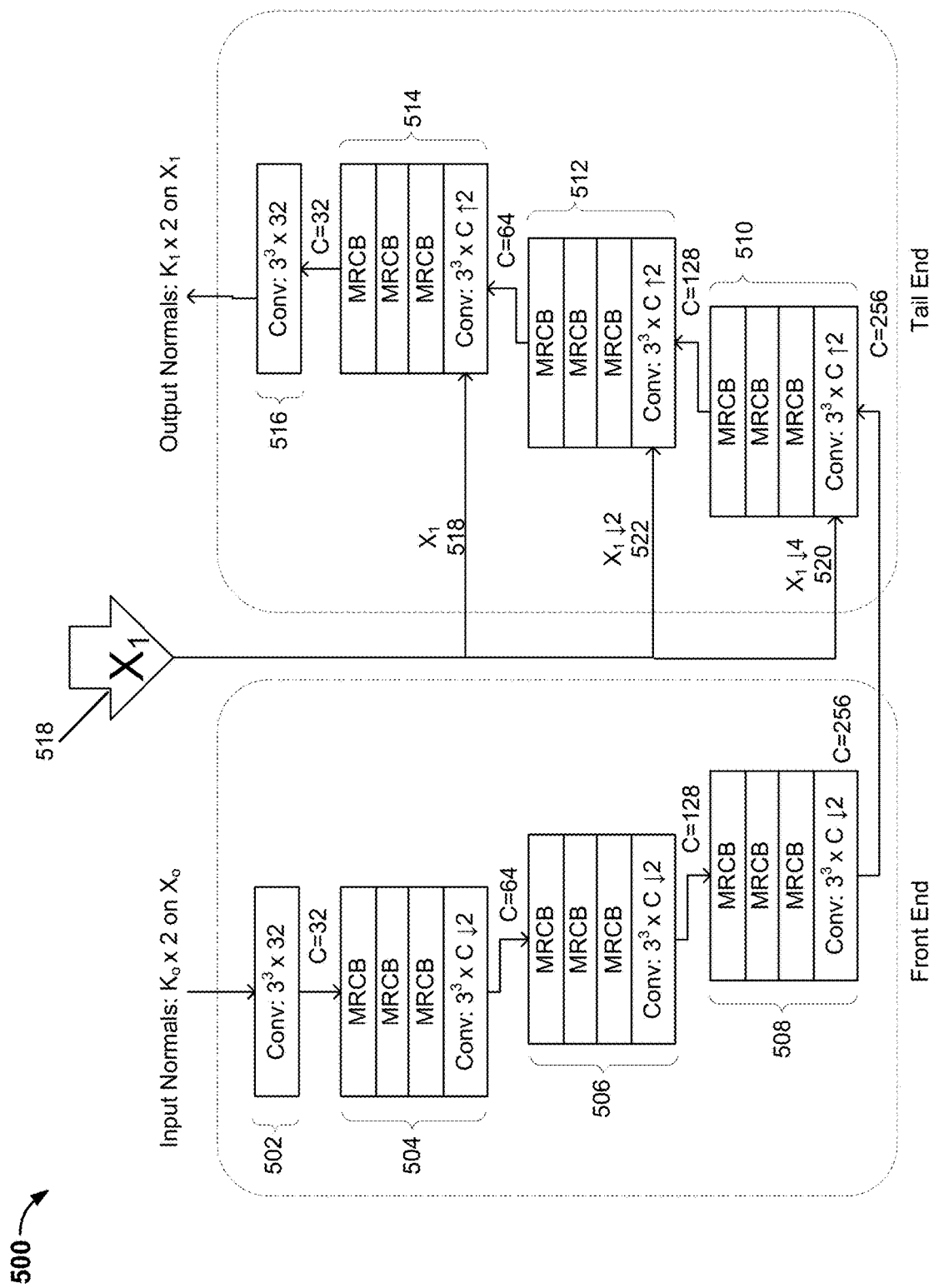
FIG. 5 shows an illustrative example of a normal vector prediction model, in accordance with some embodiments of this disclosure.

In some embodiments, the NSR network 124 predicts a probability of a vector direction being perpendicular to a mesh object cube at each occupied centroid in the mesh object cube. In some aspects, the NSR network 124 may determine a probability that a predicted attribute value (e.g., a predicted value for α, a predicted color value, etc.) at a centroid matches the actual attribute value (e.g., actual value of α for a normal vector at the centroid, an actual color value, etc.). As an illustrative example, the NSR network 124 may be trained to generate a loss metric on the normal vector in a similar manner as predicting color attribute values of a point cloud. Based on the loss metric, the NSR network 124 may determine ($\alpha$, $\beta$) for the predicted normal vector. The normal vector prediction may be achieved via a multi-resolution 3D learning network that is illustrated in FIG. 5.

The output of the NSR network 124 may be a probability of an angle value, or a pair of angle values corresponding to a vector direction, being a match candidate (e.g., being perpendicular) for each occupied centroid of the mesh object cube (e.g., a matrix of size N'×K, N' being the number of occupied vertices of the N centroids of the mesh object cube). K may be in a range of 8 to 12 for practical reasons, or K may be a different number based on usage context (e.g., limiting the number of candidate samples to save memory and/or processing time). The probability of an attribute value matching the correct attribute value can be used to identify which of the candidates should be at an occupied centroid of the mesh object cube and to include as a predicted parameter of the C-N representation 104.

In some embodiments, the NSR network 124 determines the candidates that are included based on the probabilities. As an illustrative example, the input to the NSR network 124 may be a match probability (e.g., probability matrix having size N'×K of each occupied centroid of the mesh object cube), and the output may be the predicted angle values (e.g., pairs of $\alpha$ and $\beta$). The NSR network 124 may indicate whether or not a pair of predicted angles match an occupied centroid in the mesh object cube (e.g., probability matrix of size N'×K, N' being the number of occupied centroids of the N centroids of the mesh object cube, with an entry "1" indicating a match, and an entry "0" indicating no match). The NSR network 124 may compare the probability of a match (predicted values of each angle or pair of angles) to a threshold value (e.g., to indicate whether the predicted angles correspond to a direction perpendicular to the mesh object cube at the occupied centroid). If the probability of a match is greater than the threshold value, the NSR network 124 includes the predicted values (e.g., for each angle or pairs of angles) in the predicted normal vectors of the C-N representation 104 (e.g., entry of the corresponding candidate is set to "1").

If the probability of a match is less than or equal to the threshold value, the NSR network 124 does not include the predicted values (e.g., for each angle or pairs of angles) in the predicted normal vectors of the C-N representation 104 (e.g., entry of the corresponding candidate is set to "0"). In some embodiments, the corresponding candidate is included if the probability of a match is greater or equal to a threshold value and is excluded if the probability of a match is less than the threshold value. The NSR network 124 may determine a difference between the predicted normal vectors corresponding to a target hi-res mesh and the normal vectors of the target hi-res mesh. For example, the NSR network 124 may subtract the probability matrix representing the predicted normal vector angles corresponding to the C-N representation 104 from the probability matrix representing the angles of the normal vectors 108 of the C-N representation 104, resulting in the normal vector residual.

The system 100 computes a normal vector residual based on the associated errors between the predicted representation and the C-N representation 104 of the hi-res mesh 101. The NSR network 124 may determine the normal vector residual based on a loss metric (e.g., cross-entropy, log loss, etc.). In some aspects, the loss metric indicates a difference between probability distributions for determining whether an estimated parameter (e.g., predicted angle) matches a true value (e.g., actual angle) in the prediction model. For example, the NSR network 124 may determine a BCE loss metric for each predicted normal vector parameter (e.g., organized as a residual matrix or other data structure). The BCE loss metric signals a difference between the predicted quantities. The NSR network 124 may determine the normal vector residuals based on the BCE loss metric. The normal vector residuals may be coded, for example, as the bitstream $R_2$ of the encodings 132 (e.g., via binary arithmetic coding or other coding schemes).

In some embodiments, the NSR network 124 is trained according to a second learning algorithm, for example, by adjusting weights of the second learning algorithm until the normal vector prediction model begins predicting output high-resolution normal vector information from the high-resolution centroid information and low-resolution normal vector information with a sufficient degree of correctness. The weights adjusted by the second learning algorithm may be weights of the normal vector prediction model (e.g., weights of a neural network) used to predict output of high-resolution normal vector information from the high-resolution centroid information and low-resolution normal vector information. Correctness may be based on ground truth high-resolution normal vector information. For example, a sufficient degree of correctness may be when the normal vector prediction model outputs a predicted high-resolution normal vector information that is close (e.g., within a suitable tolerance, e.g., within 1% accuracy) to the ground truth high-resolution normal vector information from an input of ground-truth high-resolution centroid information and low-resolution normal vector information.

The system 100 outputs the encodings 120 and 132 for content rendering and reconstruction. For example, the system 100 at a server may output the encodings 120 and 132 to a receiving device (e.g., system 200) in some client/server embodiments. In some embodiments, the system 100 outputs the data structure 126. The system 100 transmits (e.g., via a communication network) the encodings 120 and 132 for decoding, rendering, and/or reconstruction of media content for display at a client device or other user equipment. For example, the system 100 may generate and transmit the bitstreams $R_0$, $R_1$, $R_2$ to an XR engine (e.g., at a virtual environment server, a VR head-mounted display (HMD), etc.) for further processing. The XR engine may decode the bitstreams, reconstruct the hi-res mesh, and/or generate for display the 3D media content. In some embodiments, a decoder at the client device receives the encodings 120 and 132 for processing as described regarding FIG. 2.

Figure 2:
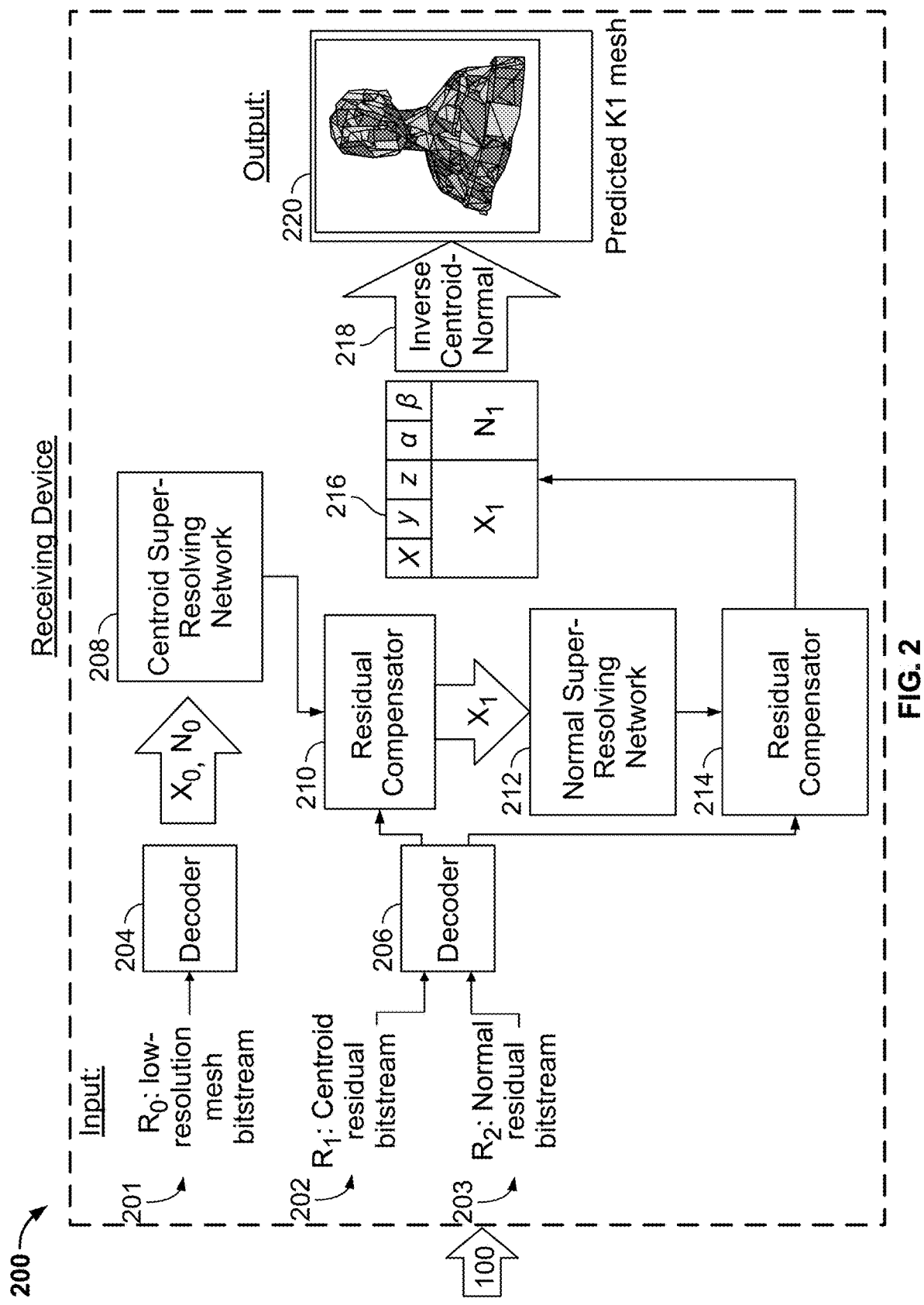
FIG. 2 shows an illustrative example of a predictive decoding system, in accordance with some embodiments of this disclosure.

FIG. 2 shows an illustrative example of a predictive decoding system 200, in accordance with some embodiments of this disclosure. The system 200 comprises a decoder 204 (e.g., a mesh decoder 204), a decoder 206 (e.g., a residual decoder 206), a CSR network 208, a residual compensator 210, an NSR network 212, a residual compensator 214, and an inverse C-N module 218. For example, the system 200 may be partially or wholly implemented at a receiving device in some client/server-based embodiments. In one or more embodiments, the CSR network 208 and the NSR network 212 of the system 200 respectively correspond to the CSR network 122 and the NSR network 124 of the system 100 as described regarding FIG. 1. For example, the CSR network 208 and the NSR network 212 may have the same model parameters (e.g., weights, connections, model tuning, etc.) as the CSR network 122 and the NSR network 124. For example, the CSR network 208 and the NSR network 212 may respectively have the same network architecture and adjusted model parameters as the CSR network 122 and the NSR network 124.

The system 200 receives, as inputs (e.g., via a communication network from system 100), a lo-res mesh bitstream 201, a centroid residual bitstream 202, and a normal residual bitstream 203. The system 200 generates decoding of the bitstreams 201-203 via decoders 204 and 206. For example, the system 200 may utilize a mesh geometry coding tool such as Draco to decode one or more of the bitstreams 201-203. In some embodiments, the decoder 204, 206 is the same decoder depending on the coding of the bitstreams 201-203. The decoder 204 outputs centroids and normal vectors of a C-N representation (e.g., corresponding to centroids 112 and normal vectors 114 at the system 100) for a lo-res mesh (e.g., corresponding to the mesh 103 at the system 100). The system 200 inputs the centroids and normal vectors to a CSR network 208. The CSR network 208 generates predicted centroids (e.g., centroids $X'_1$) corresponding to a hi-res C-N representation (e.g., the C-N representation 104). The decoder 206 outputs the decoded residuals based on the encodings 202-203. The system 200 inputs the predicted centroids and the centroid residuals to a residual compensator 210 to generate reconstructed centroids $X_1$ (e.g., the centroids 106). The system 200 inputs the centroids to an NSR network 212. The NSR network generates predicted normal vectors. The system 200 inputs the predicted normal vectors and the normal vector residuals to a residual compensator 214. The system 200 generates reconstructed normal vectors $N_1$ (e.g., normal vectors 108). The system 200 generates a reconstructed C-N representation 216 (e.g., C-N representation 104) comprising the centroids $X_1$ and the normal vectors $N_1$. The system 200 generates a reconstructed hi-res mesh using an inverse C-N module 218 on the C-N representation 216.

As an illustrative example of an inverse C-N transform, a mesh element may correspond to a centroid having coordinates $(x_0, y_0, z_0)$ and a normal vector having components $(n_x, n_y, n_z)$. The normal vector may be computed based on the angles $(\alpha, \beta)$ as described regarding the C-N transform. Since the normal vector is perpendicular to any point in a plane, the parameters of a mesh element may be represented as a plane using the following equation.

$$(n_x, n_y, n_z) * (x - x_0, y - y_0, z - z_0) = ax + by + cz + d = 0$$

For example, the plane of a mesh element having centroid at $(-2,3,4)$ and a normal vector of $(1, 3, -7)$ would be computed as $x+3y-7z+21=0$, or plane parameters $a=1$, $b=3$, $c=-7$, $d=21$. The system 200 generates a data structure (e.g., a matrix) comprising the plane parameters a, b, c, d for each mesh element. For example, each row may represent the plane parameters of a mesh element. The system 200 may solve the matrix data structure using any suitable matrix-solving techniques. For example, the data structure may represent K1 mesh elements corresponding to the mesh 101. In this example, the system 200 may generate vertices and connections for the mesh elements based on the corresponding planes (e.g., based on the intersections of neighboring planes). It is contemplated that the mesh elements may be generated in various ways based on a C-N representation (e.g., the C-N representation 216) without departing from the teachings of the present disclosure.

The system 200 generates a reconstructed hi-res mesh 220 based on the C-N representation 216. For example, the hi-res mesh 220 may be a predicted mesh corresponding to the mesh 101. In some aspects, the system 200 predicts a hi-res mesh based on a lo-res mesh input using a prediction model and reconstructs the hi-res mesh based on encoded residuals. The system 200 may generate the media content based on the hi-res mesh 220 for display at the client device (e.g., via a content render). For example, if the media content is a 3D model of a person, the system 200 may cause a graphic renderer at the client device to generate the 3D model based on the mesh 220.

In some embodiments, the decoder 204 comprises one or more different components than the decoder 206. For example, the decoder 204 may include a mesh decoder for generating a mesh based on information in the bitstream 201. In this example, the system 200 may receive an encoding of a lo-res mesh (e.g., the mesh 103) as bitstream 201. The decoder 204 may decode the bitstream 201 to recover, for example, vertex and connectivity data of the lo-res mesh. The system 200 generates, based on the vertex and connectivity data, a C-N representation (e.g., C-N representation 110) having centroids $X_0$ and normal vectors $N_0$. The system 200 may generate a reconstructed mesh (e.g., the mesh 220) based on the C-N representation as described in the foregoing paragraphs. Additionally, or alternatively, the decoder 206 may include a residual decoder for decoding residual bitstreams 202, 203. The system 200 may generate the reconstructed C-N data via residual compensators 210, 214 as described in the foregoing paragraphs.

In some embodiments, the residual compensator 210 compensates for differences between predicted centroids (e.g., centroids $X'_1$) of a target hi-res mesh and the centroids (e.g., centroids $X_1$) of the target hi-res mesh. For example, the system 200 may input the predicted centroids (e.g., centroids $X'_1$) and the decoded centroid residuals to residual compensator 210. To compensate for the difference, the residual compensator 210 may add the centroid residuals to the predicted centroids to recover the centroids $X_1$ of the hi-res mesh. For example, a first occupancy matrix may represent occupancy of the actual centroids $X_1$ corresponding to a target mesh. A second occupancy matrix may represent occupancy of the predicted centroids $X'_1$ corresponding to the target mesh. The centroid residual may be a third occupancy matrix representing the first occupancy matrix minus the second occupancy matrix. As an illustrative example, an entry in the first occupancy matrix may be "0," indicating no centroid, but a corresponding entry in the second occupancy matrix may be "1," indicating a predicted centroid. The difference would be "−1" for that entry in the third occupancy matrix. To compensate, the residual compensator 210 may add the difference to the corresponding entry in the second occupancy matrix. The residual compensator 210 may determine a "0" for that entry in a compensated occupancy matrix, thus correcting for the difference (e.g., indicating the corresponding centroid is not occupied in the target mesh).

In some embodiments, the residual compensator 214 compensates for differences between predicted normal vectors (e.g., normals $N'_1$) of a target hi-res mesh and the normal vectors (e.g., normals $N_1$) of the target hi-res mesh in an analogous manner as the residual compensator 210. For example, the residual compensator 210 may be the same module as the residual compensator 214. As an illustrative example, a first probability matrix may represent a matching angle of the actual normal vectors $N_1$ corresponding to a target mesh. A second probability matrix may represent a matching angle of the predicted normal vectors $N'_1$ corresponding to the target mesh. A normal vector residual may be a third probability matrix representing the first probability matrix minus the second probability matrix. Analogous to the predicted centroid compensation of the residual compensator 210, the residual compensator 214 may add a difference from the third probability matrix to a corresponding entry in the second probability matrix and determine a compensated entry, thus correcting for the difference (e.g., indicating the corresponding angle is not a match in the target mesh).

In some embodiments, a predictive coding framework is extended to accommodate an adaptive streaming use case. For example, the system 100 may generate encodings based on the same mesh representation having multiple resolution levels and bitrates for a content item. In some embodiments, the mesh simplifier 102 generates multiple downscaled versions of the hi-res mesh 101. The system 100 may generate encodings of the downscaled versions. The encodings may be stored, for example, in a content delivery network (CDN) (e.g., a globally accessible content database, an edge server, etc.). In some embodiments, the multiresolution representations are applicable to progressive mesh reconstruction and/or other adaptive rendering techniques when bandwidth is limited. A bitstream representing the low-resolution mesh (e.g., from a mesh simplifier) may be delivered first for fast decoding and rendering at a client device. A high-resolution mesh may be reconstructed by a predictive coding framework when the bitstreams of the centroid and normal vector residuals are delivered to the client device. For example, the system 100 may generate a first plurality of encoded frames corresponding to a movie having 1080p resolution and a second plurality of encoded frames corresponding to the movie having 480p resolution as described regarding FIG. 1. In some embodiments, an encoder is configured to encode multiple bitrates for adaptive streaming. The encoder may dynamically select a base, or low-resolution, mesh and/or generate a different mesh simplification for each target bitrate. For example, groups of MRCBs (e.g., in the CSR network 122 and the NSR network 124) and associated weights of the prediction model may vary based on the rate distortion optimization decision and the selected low-resolution mesh. The bitstream may include the signaling of such selections so that a decoder (e.g., at a client device or CDN server) selects the corresponding prediction model to reconstruct the mesh. A content streaming system may be implemented to include this dynamic selection of MRCB groups for the prediction of both centroid and normal vector information.

Based on receiving a request for a content item and a selected visual quality and/or resolution level, the system 100 may transmit the corresponding encodings (e.g., as bitstreams). In some embodiments, the system 100 automatically transmits the encodings having different visual quality levels for adaptive content delivery based on determining an available bandwidth or other network characteristics (e.g., latency, number of connected devices, fault tolerance, data transfer rates, etc.) for a plurality of devices. For example, the system 100 may determine that a device has a bandwidth capable of streaming a resolution level of up to 1080p and may determine that the device has a currently reduced available bandwidth, for example, capable of supporting a 480p resolution. In response, the system 100 may select, transmit, and/or generate the decoded frames for display at the device. The system 100 may adaptively transmit and/or generate decoded frames having 480p resolution based on determining that the device has a reduced available bandwidth. The system 100 may revert to transmitting and/or decoding the frames having 1080p resolution based on determining that the device has increased available bandwidth that are capable of supporting streaming content having 1080p resolution. In some embodiments, the system 100 may select, transmit, and decode content at progressively upscaled or downscaled resolution levels. For example, the system 100 may determine that the available bandwidth at a device starts at an amount sufficient for streaming 480p resolution content and is increasing to an amount capable of supporting streaming 1080p resolution content. The system 100 may start with providing decoded frames having 480p resolution, then progressively provide decoded frames at increasing resolution levels in correspondence with the increasing bandwidth. In an analogous example, the system 100 may provide decoded frame in correspondence with decreasing bandwidth.

Figure 3:
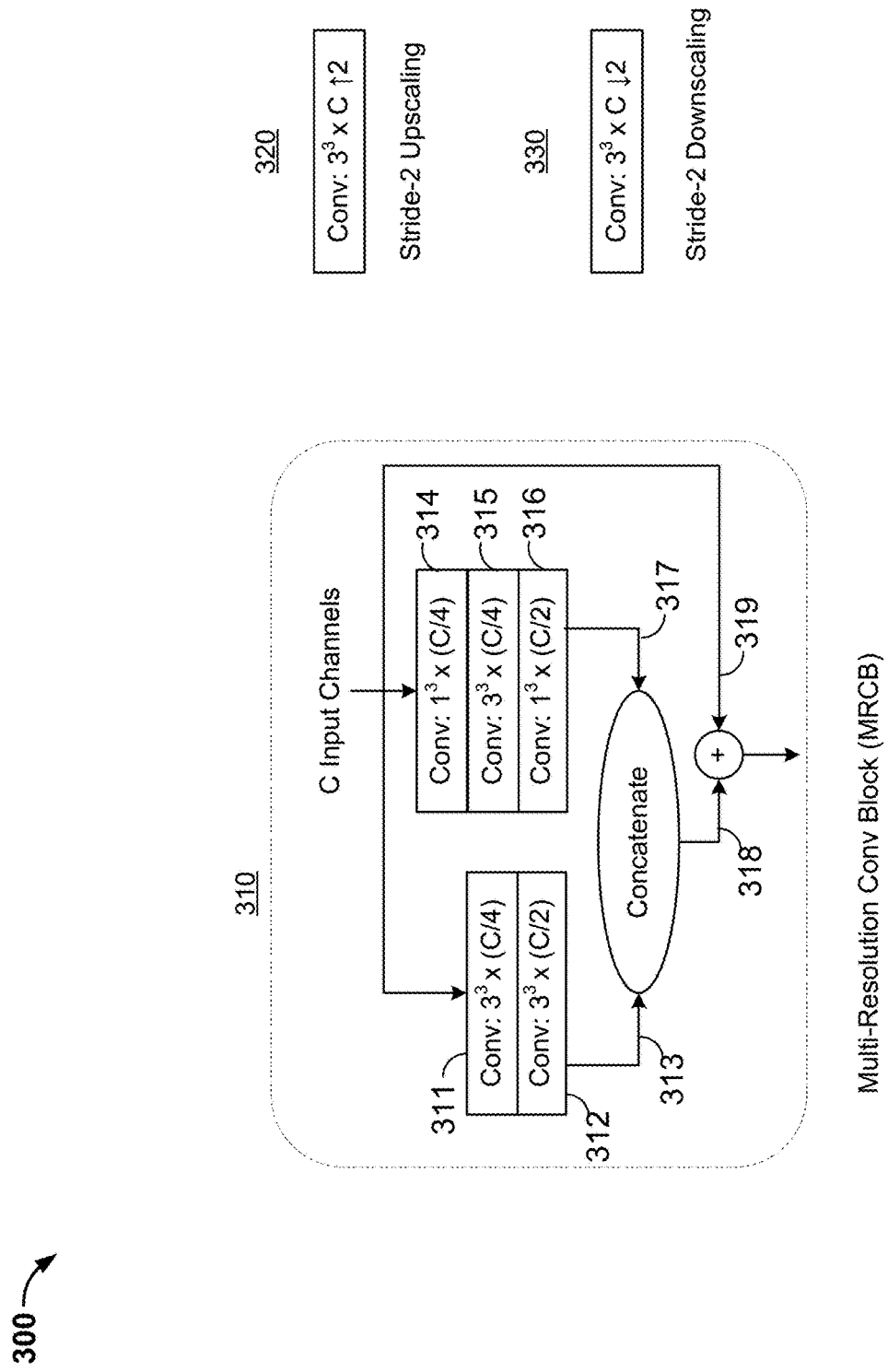
FIG. 3 shows an illustrative example of a multi-resolution convolution block (MRCB), stride-2 upscaling block, and stride-2 downscaling block, in accordance with some embodiments of this disclosure.

FIG. 3 shows an illustrative example 300 of an MRCB 310, stride-2 upscaling block 320, and stride-2 downscaling block 330, in accordance with some embodiments of this disclosure. The MRCB 310 takes an input of C input channels. As illustrated at the non-limiting example 300, the C input channels and/or copies thereof continue along one or more paths. In one or more embodiments, the processes corresponding to the one or more paths may be implemented sequentially, concurrently, in parallel, simultaneously, etc. Copies of the C input channels may be referred to herein as the C input channels for brevity. At a first path shown at the example 300, the C input channels drive a "Conv: $3^3 \times (C/4)$" layer 311 and a "Conv: $3^3 \times (C/2)$" layer 312 that outputs a first sub-output 313. The "Conv: $3^3 \times (C/4)$" layer 311 indicates a convolution by a 3×3×3 filter size for C/4 channels, and the "Conv: $3^3 \times (C/2)$" layer 312 indicates a convolution by a 3×3×3 filter size for C/2 channels. As an example, if the input (e.g., C input channels) to the MRCB is C=128, then the "Conv: $3^3 \times (C/4)$" layer 311 is a "Conv: $3^3 \times 32$" layer and the "Conv: $3^3 \times (C/2)$" layer 312 is a "Conv: $3^3 \times 64$" layer. At a second path shown at the example 300, the C input channels drive a "Conv: $1^3 \times (C/4)$" layer 314, a "Conv: $3^3 \times (C/4)$" layer 315, and a "Conv: $1^3 \times (C/2)$" layer 316 that outputs a second sub-output 317. The "Conv: $1^3 \times (C/4)$" layer 314 indicates a convolution by a 1×1×1 filter size for C/4 channels, the "Conv: $3^3 \times (C/4)$" layer 315 indicates a convolution by a 3×3×3 filter size for C/4 channels, and the "Conv: $1^3 \times (C/2)$" layer 316 indicates a convolution by a 1×1×1 filter size for C/2 channels. Continuing with the previous example, if the input is C=128, then "Conv: $1^3 \times (C/4)$" layer 314 is a "Conv: $3^3 \times 32$" layer, the "Conv: $3^3 \times (C/4)$" layer 315 is a "Conv: $3^3 \times 32$" layer, and the "Conv: $1^3 \times (C/2)$" layer 316 is a "Conv: $1^3 \times 64$" layer. The first sub-output 313 (e.g., C/2 output feature channels) is concatenated with the second sub-output 317 (e.g., C/2 output feature channels) to generate a concatenated sub-output 318. The concatenated sub-output 318 may result in C output feature channels. Continuing with the previous example, if the input is C=128, the first sub-output 313 (e.g., 64 output feature channels) is concatenated with the second sub-output 317 (e.g., 64 output feature channels) to form a concatenated sub-output 318 (e.g., 128 output feature channels). The concatenated sub-output 318 is added to the C input channels 319. The output of the MRCB 310 is the sum of the concatenated sub-output 318 and the C input channels 319 (e.g., if input is C=128, the output of the MRCB 310 is of 128 channels).

An example stride-2 upscaling block 320 and an example stride-2 downscaling block 330 are also shown in FIG. 3. Block 320 may be applied in conjunction with the MRCB 310 during a tail end portion of a multi-resolution convolutional network (e.g., blocks 410-414 at FIG. 4). Block 330 may be applied in conjunction with the MRCB 310 during a front end portion of a multi-resolution convolutional network (e.g., groups 404-408 at FIG. 4). For example, output of one or more MRCB blocks 310 may be convolved with a stride-2 downscaling convolution layer. For example, input of one or more MRCB blocks 310 may be pre-convolved with a stride-2 upscaling convolution layer. In some embodiments, a stride-N downscaling/upscaling block is used, where N is an integer greater than 1. For example, in place of a stride-2 downscaling block and a stride-2 upscaling block where N=2, a different N, such as N being an integer greater than 2 may be used in accordance with some embodiments of this disclosure. In some embodiments, any appropriate filter size may be used in a stride-N downscaling/upscaling block (e.g., in place of a 3×3×3 or $3^3$ filter size, a different filter size may be used).

Figure 4:
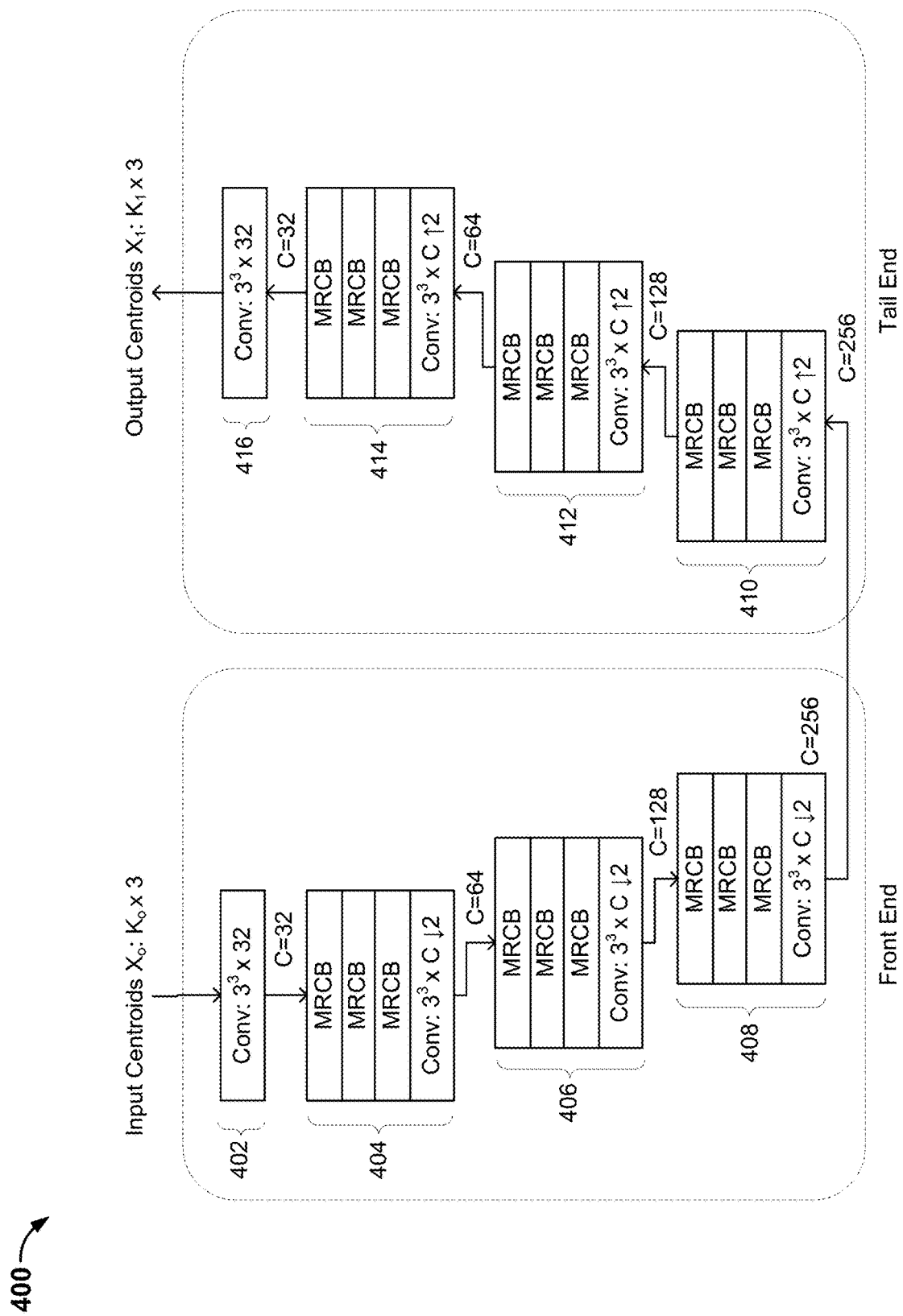
FIG. 4 shows an illustrative example of a centroid occupancy prediction model, in accordance with some embodiments of this disclosure.

FIG. 4 shows an illustrative example of a centroid occupancy prediction model 400, in accordance with some embodiments of this disclosure. The centroid occupancy prediction model 400 comprises a multi-resolution 3D space occupancy convolutional network having a front end portion and tail end portion. For example, the CSR networks 122, 208 may comprise the centroid occupancy prediction model 400. As an example, a predictive coding framework may train the centroid occupancy prediction model 400 based on mesh geometry information (e.g., centroids of a hi-res mesh and of a simplified or lo-res version of the hi-res mesh), such that the centroid occupancy prediction model 400 is configured to receive a low-resolution mesh information (e.g., centroids, point cloud attributes, etc.) and generate centroids of a high-resolution mesh (e.g., a predicted upscaled version of the lo-res mesh). The centroid occupancy prediction model 400 may be trained by adjusting weights until the prediction model generates an output of high-resolution centroid information from the low-resolution centroid information with a sufficient degree of correctness.

The centroid occupancy prediction model 400 has a front end portion and a tail end portion. The front end of the centroid occupancy prediction model 400 receives a low-resolution mesh centroid matrix $X_0$ of size $K_0 \times 3$. For example, a target high-resolution mesh may be simplified to generate a low-resolution mesh with a reduced number of $N_o$ centroids represented by 3D coordinates (x, y, z). The front end of the centroid occupancy prediction model 400 downscales the input mesh geometry by reducing the spatial resolution (e.g., scaled down by a factor of 2, convolution by skipping the next sampling point) and expands the feature channels. The tail end of the centroid occupancy prediction model 400 receives the downscaled input with reduced spatial resolution and expanded feature channels. The tail end upscales the downscaled input having reduced spatial resolution by increasing the spatial resolution and shrinking the feature channels. The tail end outputs a high-resolution mesh centroid matrix $X_1$ of size $K_1 \times 3$. In some embodiments, the tail end outputs a centroid occupancy probability matrix of size N×1. The tail end may output a loss metric (e.g., cross-entropy, log loss, BCE, etc.) with the centroid coordinates. A predictive coding framework codes the loss metric as centroid residuals, for example, to drive a binary arithmetic coding scheme for generating lossless bitstreams.

The input to the centroid occupancy prediction model 400 includes centroids of a lo-res mesh of size (e.g., input geometry) $K_o \times 3$, where $K_o$ is a fraction (e.g., a small fraction) of centroids of the target hi-res mesh. The input centroids may be processed by layer 402 (e.g., "Conv: $3^3 \times 32$" block) to generate an initial feature of 32 channels. The "Conv: $3^3 \times 32$" label of layer 402 may indicate a convolution by 3×3×3 (e.g., 33) filter size for 32 channels.

A 3D convolution engine Minkowski Network (e.g., as described in GitHub, NVIDIA, Minkowski Engine, accessed on Jun. 14, 2022, which is hereby incorporated by reference herein in its entirety) may be used to generate initial feature channels. For example, the input is convolved with a 3D sparse convolution engine Minkowski Network (e.g., a standard tool in some PYTHON 3D packages) to generate an initial feature of 32 dimensions (e.g., 32 feature channels).

The initial feature of 32 dimensions is processed with a multi-resolution network via groups of MRCBs (e.g., corresponding to the MRCB 310) and a stride-2 downscaling convolution layer (e.g., "Conv: $3^3 \times C \downarrow 2$" block corresponding to the block 330) to produce an expansion of feature channels (and decrease the spatial resolution). Groups of the MRCBs and the stride-2 downscaling convolution layer may be implemented to produce expanded feature channels from initial feature channels. For example, first, second, and third expansion groups 404, 406, and 408, each comprising three MRCBs and a stride-2 downscaling convolution layer (e.g., "Conv: $3^3 \times C \downarrow 2$" block), receive the initial feature of 32 channels and generate a corresponding expansion of feature channels (e.g., C=64, C=128) until reaching a layer of 256 channels.

After the expansion of initial feature channels becomes 256 (e.g., C=256), the expanded feature of 256 channels is processed by the tail end portion of the centroid occupancy prediction model 400 via groups of a stride-2 upscaling convolution layer (e.g., "Conv: $3^3 \times C \uparrow 2$" block) and the MRCBs to produce output feature channels. Groups of a stride-2 upscaling convolution layer (e.g., "Conv: $3^3 \times C \uparrow 2$" block) and MRCBs may be implemented to produce output feature channels from the expanded feature channels (and to increase the spatial resolution). For example, first, second, and third contraction groups 410, 412, and 414, each comprising a stride-2 upscaling convolution layer (e.g., "Conv: $3^3 \times C \uparrow 2$" block) and three MRCBs, receive the expanded feature of 256 channels and generate a corresponding contraction of feature channels to 128, 64, and 32.

The contracted feature of 32 channels from the group 414 is processed by a layer 416 (e.g., "Conv: $3^3 \times 32$" block) to generate an output feature. In some embodiments, the output feature is a final output feature. A 3D convolution engine Minkowski Network may be used to generate the output feature. For example, the output feature of 32 channels may be convolved with a 3D sparse convolution engine Minkowski Network to generate a final output feature.

In some embodiments, the output feature from the layer 416 is an intermediate output feature that is processed by one or more additional layers (e.g., any suitable layers of a centroid occupancy prediction model). In some embodiments, the centroid occupancy prediction model 400 generates an output feature indicating the probability of occupancy for centroids of a mesh object (e.g., via cross-entropy loss metric, a classification probability layer, etc.). In some embodiments, the centroid occupancy prediction model 400 generates an output feature indicating the predicted centroids of a target high-resolution mesh.

It is noted that the aforementioned numbers of feature channels and corresponding groups are intended to be illustrative, non-limiting examples, and any number of groups may be included in the front end and/or tail end portions of the centroid occupancy prediction model 400 without departing from the teachings of the present disclosure. In some embodiments, any suitable number of MRCBs (e.g., a different number than three) may be used in the expansion groups and the contraction groups. For example, in place of three MRCBs, there may be five MRCBs used in the expansion and the contraction groups. In some embodiments, any suitable number of expansion groups and contraction groups (e.g., a different number than three) may be used. For example, in place of three expansion groups and three contraction groups, there may be five expansion groups and five contraction groups. In some embodiments, any of the layers of the network may be any appropriate filter size and channel (e.g., in place of "Conv: $3^3 \times 32$" label of layer 202, which may indicate a convolution by $3 \times 3 \times 3$ (e.g., 33) filter size for 32 channels, a different suitable filter size or number of channels may be used). For example, in place of 32 channels, it could be 64, 128, or any other appropriate number. While FIG. 4 shows one example network model, any suitable network model for predicting the occupancy probability of centroids may be implemented.

In some aspects, an encoder as described herein utilizes the centroid occupancy prediction model 400 to generate the predicted centroids, at least in part, by using a 3D convolution engine Minkowski Network to generate initial feature channels. The encoder may implement a first plurality of groups of MRCBs and a Stride-2 downscaling convolution layer to produce, from the initial feature channels, expanded feature channels. The encoder may use a second plurality of groups of a Stride-2 upscaling convolution layer and the MRCBs to produce, from the expanded feature channels, output feature channels. The encoder may use the 3D convolution engine Minkowski Network to generate, from the output feature channels, a final output feature. For example, an output feature may be a mesh object (e.g., a mesh object cube). The mesh object may be a 3D data structure defining some or all potential centroids for a target high-resolution mesh. For example, the 3D structure may be a table, where each entry in the table represents a potential centroid. For example, if an entry in a table for (x,y,z), e.g., (15, 15, 15) is "1," then there is a centroid. For example, if an entry in a table for (x,y,z), e.g., (15, 15, 15) is "0," then there is no centroid.

FIG. 5 shows an illustrative example of a normal vector prediction model 500, in accordance with some embodiments of this disclosure. For the normal vectors, an analogous multi-resolution network architecture for centroid prediction may be implemented. For example, layer 502, first, second, and third expansion groups 504, 506, and 508, first, second, and third contraction groups 510, 512, and 514, and layer 516 of FIG. 5 may correspond to layer 402, first, second, and third expansion groups 404, 406, and 408, first, second, and third contraction groups 410, 412, and 414, and layer 416 of FIG. 4, respectively.

The normal vector prediction model 500 receives normal vectors corresponding to centroids for a lo-res mesh having $K_0$ mesh elements. The input normal vectors may be organized in a matrix data structure of size $K_0 \times 2$. The normal vector prediction model 500 receives the centroids 518 corresponding to a target hi-res mesh having $K_1$ mesh elements. The centroids 518 may be organized in a matrix data structure of size $K_1 \times 3$. For example, the input geometry of normal vector prediction model 500 may include a matrix of $K_1 \times 3$ (e.g., list of $K_1$ centroids, each with (x,y,z) coordinates). In some embodiments, the centroids 518 are reconstructed centroids based on compensating predicted centroids (e.g., from the CSR network 208) by summing a centroid residual via a residual compensator (e.g., the residual compensator 210). The front end portion of the normal vector prediction model 500 may generate the expanded feature channels in an analogous manner as the front end portion of the centroid occupancy prediction model 400. That is, the front end of the normal vector prediction model 500 downscales the input mesh geometry by reducing the spatial resolution (e.g., scaled down by a factor of 2, convolution by skipping the next sampling point) and expands the feature channels.

The expanded feature channels (e.g., C=256 channels) are processed by the tail end portion of the normal vector prediction model 500 via groups of a stride-2 upscaling convolution layer (e.g., "Conv: $3^3 \times C \uparrow 2$" block) and the MRCBs to generate output feature channels and increase the spatial resolution. For example, first, second, and third contraction groups 510, 512, and 514, each comprising a stride-2 upscaling convolution layer (e.g., "Conv: $3^3 \times C \uparrow 2$" block) and three MRCBs, receive the expanded feature of 256 channels and generate a corresponding contraction of feature channels to 128, 64, and 32.

As an example, a predictive coding framework may train the normal vector prediction model 500 based on mesh geometry information (e.g., high resolution mesh centroids and normal vector angles ($\alpha$, $\beta$) as ground truth). Based on the training, the normal vector prediction model 500 may be configured to receive low-resolution mesh normal information and target centroid information and generate a high-resolution mesh normal information (e.g., as angle attributes $\alpha$, $\beta$) at the target centroids. In some aspects, the normal vector prediction model 500 may be trained for predicting the mesh normals information as point cloud attributes (e.g., by matching a color attribute). The normal vector prediction model 500 may be trained by adjusting weights until the prediction model generates an output of high-resolution normal vector information from the low-resolution normal information and the high-resolution centroid information with a sufficient degree of correctness. While an analogous multi-resolution network architecture for centroid prediction is described for the normal vector prediction model 500, the models may be trained using different algorithms that may result in determining different weights for the convolution layers of each model.

The normal vector prediction model 500 receives target centroids 518 (labeled $X_1$) corresponding to a target hi-res mesh and/or downscaled versions 520, 522 of the centroids 518. The normal vector prediction model 500 may input the centroids 518 and the downscaled versions 520, 522 at various stages during the feature contraction at the tail end portion. The version 520 is inputted to the Stride-2 upscaling layer at the contraction group 510. The version 522 is inputted to the Stride-2 upscaling layer at the contraction group 512. The centroids 518 are inputted to the Stride-2 upscaling layer at the contraction group 514. In some embodiments, the normal vector prediction model 500 generates the downscaled versions 520, 522 using a Stride-2 downscaling layer. For example, the normal vector prediction model 500 generates the versions 520, 522 via the Stride-2 downscaling block 330 based on the centroids 518. The version 520 may be centroids 518 scaled once via the Stride-2 downscaling block 330. The version 522 may be centroids 518 scaled twice via the Stride-2 downscaling block 330. Additionally, or alternatively, the centroid occupancy prediction model 400 generates the versions 520, 522 as additional outputs from corresponding convolution groups. For example, the version 520 may be the expanded feature channels outputted by the expansion group 408. For example, the version 522 may be the expanded feature channels outputted by the contraction group 410. The normal vector prediction model 500 may receive the downscaled versions 520, 522 from the centroid occupancy prediction model 400. The normal vector prediction model 500 deconvolves the expanded features channels to the coordinates of the target centroids 518 at different scales. In some embodiments, the normal vector prediction model 500 determines a loss metric analogous to matching color attributes for a point cloud.

In some embodiments, any suitable number of MRCBs (e.g., a different number than three) are used in the expansion groups and the contraction groups. For example, instead of three MRCBs, there may be five MRCBs used in the expansion and the contraction groups. In some embodiments, any suitable number of expansion groups and contraction groups (e.g., a different number than three) may be used. For example, instead of three expansion groups and three contraction groups, there may be five expansion groups and five contraction groups. In some embodiments, a stride-N downscaling/upscaling block may be used, where N is an integer greater than 1. For example, instead of a stride-2 downscaling block and a stride-2 upscaling block where N=2, a different N, such as N being an integer greater than 2, may be used in accordance with some embodiments of this disclosure. In some embodiments, any appropriate filter size may be used in a stride-N downscaling/upscaling block (e.g., instead of a 3×3×3 or $3^3$ filter size, a different filter size may be used). In some embodiments, any of the layers of the network may use any appropriate filter size and channel (e.g., instead of "Conv: $3^3$×32" which may indicate a convolution by 3×3×3 (e.g., 33) filter size for 32 channels, a different filter size or number of channels may be used). For example, instead of 32 channels, it could be 64, 128, or any other appropriate number. While FIG. 5 shows one example network architecture, any suitable model that predicts the probability of an attribute match can be used (e.g., matching a color attribute).

The contracted feature of 32 channels from the group 514 is processed by a layer 516 (e.g., "Conv: $3^3$×32" block) to generate an output feature. In some embodiments, the output feature is a final output feature. A 3D convolution engine Minkowski Network may be used to generate the output feature. For example, the output feature of 32 channels may be convolved with a 3D sparse convolution engine Minkowski Network to generate a final output feature. The tail end portion of the normal vector prediction model 500 receives the downscaled input with reduced spatial resolution and expanded feature channels. The tail end upscales the downscaled input having reduced spatial resolution by increasing the spatial resolution and shrinking the feature channels. The tail end outputs a high-resolution mesh normal matrix of size $K_1$×2. The output normal vectors correspond to the target centroids 518. In some embodiments, the tail end outputs a match probability matrix of size N'×K. The tail end may output a loss metric (e.g., cross-entropy, log loss, BCE, etc.) with the normal vector information. A predictive coding framework codes the loss metric as normal vector residuals, for example, to drive a binary arithmetic coding scheme for generating lossless bitstreams.

Figure 6:
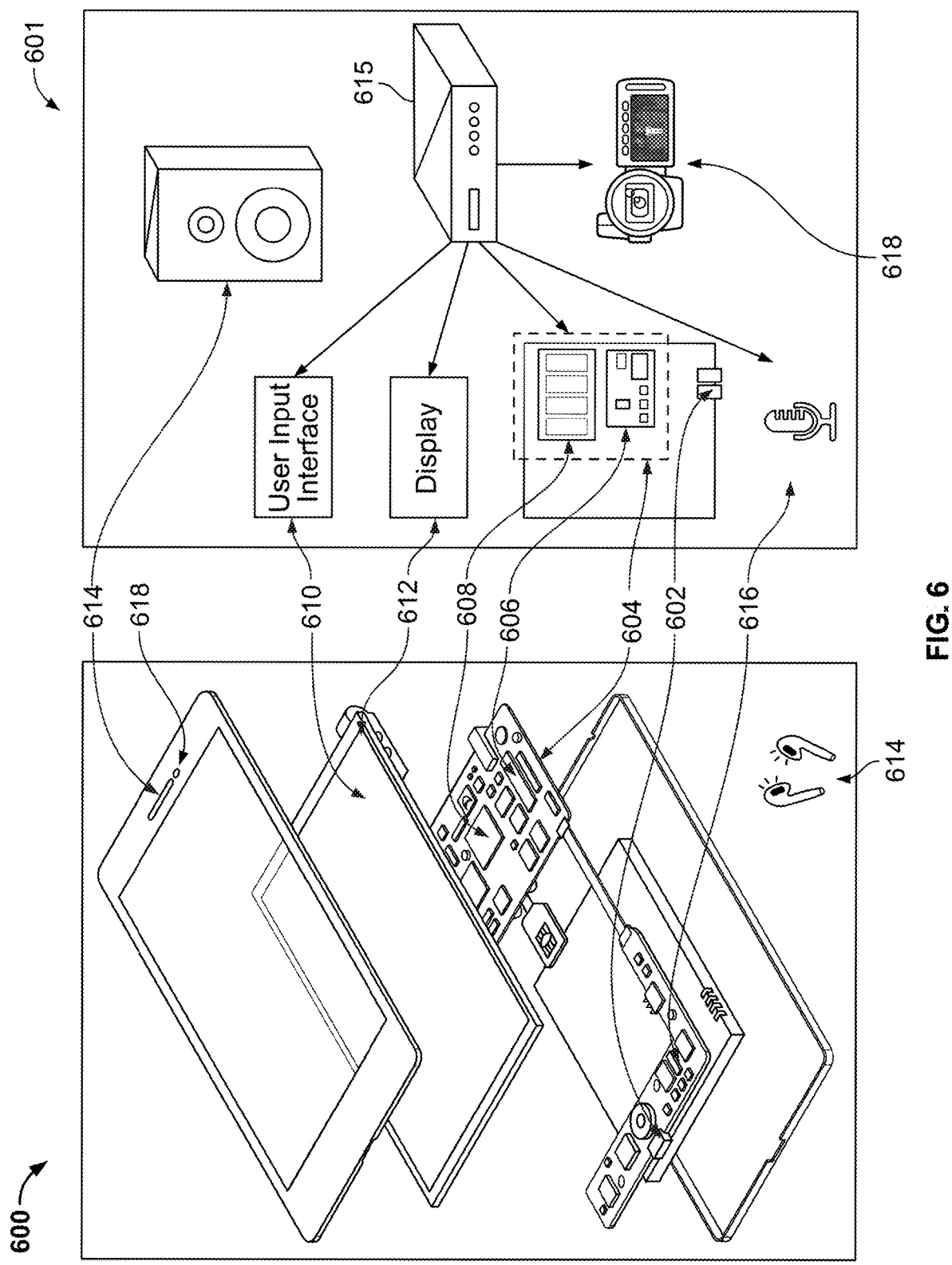
FIG. 6 shows illustrative user equipment, in accordance with some embodiments of this disclosure.
Figure 7:
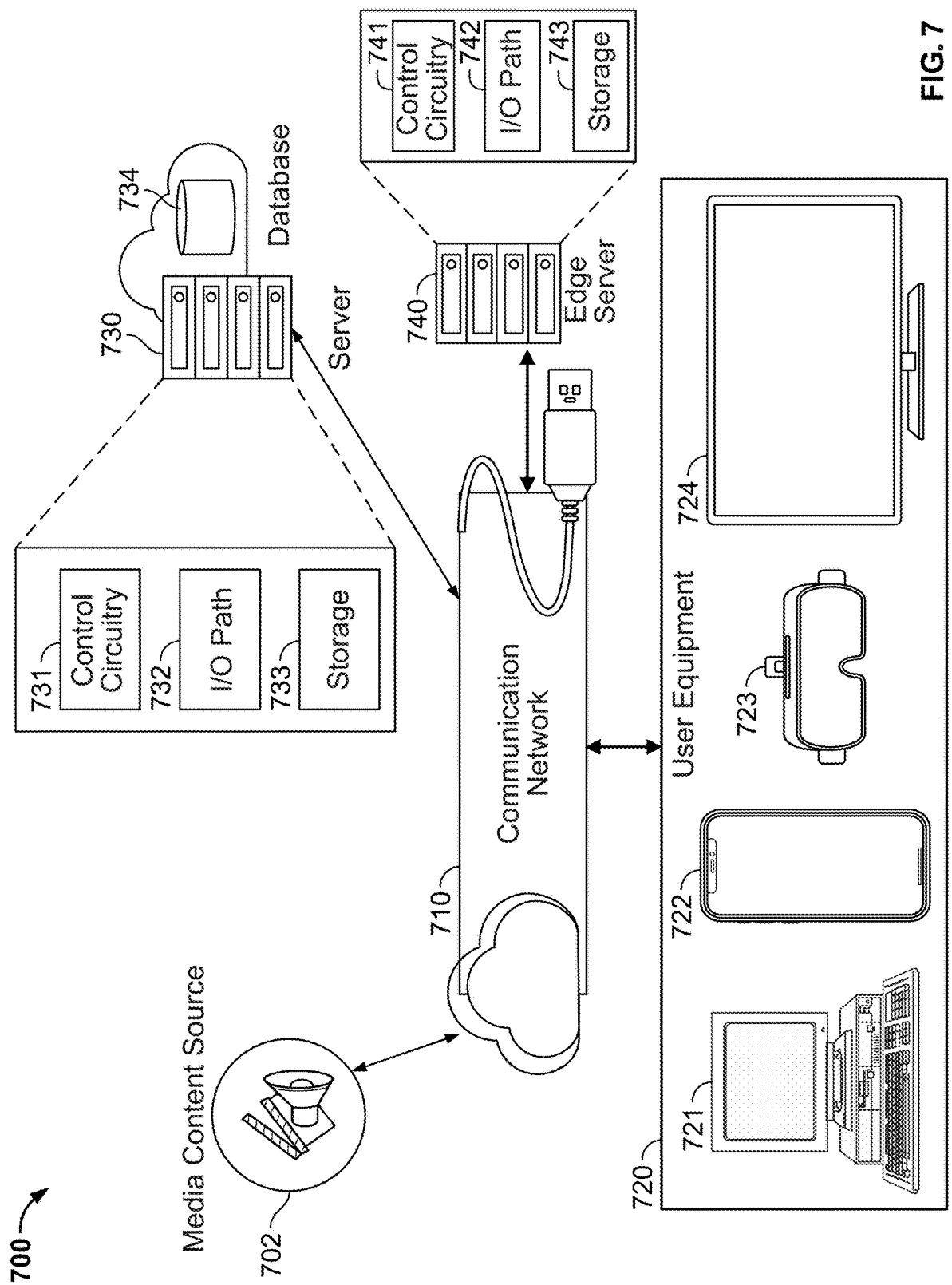
FIG. 7 shows an example system for providing content (e.g., XR content, etc.), in accordance with some embodiments of this disclosure.

FIGS. 6-7 depict illustrative devices, systems, servers, and related hardware for visual content coding/decoding. FIG. 6 shows generalized embodiments of illustrative user equipment devices 600 and 601, in accordance with some embodiments of this disclosure. For example, user equipment device 600 may be a smartphone device, a tablet, a virtual reality or augmented reality device, or any other suitable device capable of processing video data. In another example, user equipment device 601 may be a user television equipment system or device. In this example, user equipment device 601 may include set-top box (STB) 615. STB 615 may be communicatively connected to microphone 616, audio output equipment 614 (e.g., speakers, headphones, etc.), and display 612. In some embodiments, display 612 may be a television display or a computer display. In some embodiments, STB 615 may be communicatively connected to user input interface 610. In some embodiments, user input interface 610 may be a remote-control device. STB 615 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path.

Each one of user equipment device 600 and user equipment device 601 may receive content and data via input/output (I/O) path (e.g., I/O circuitry) 602. I/O path 602 may provide content (e.g., broadcast programming, on-demand programming, Internet content, content available over a local area network (LAN) or wide area network (WAN), and/or other content) and data to control circuitry 604, which may comprise processing circuitry 606 and storage 608. Control circuitry 604 may be used to send and receive commands, requests, and other suitable data using I/O path 602, which may comprise I/O circuitry. I/O path 602 may connect control circuitry 604 (and/or processing circuitry 606) to one or more communications paths (described below). I/O functions may be provided by one or more of these communications paths, but are shown as a single path in FIG. 6 to avoid overcomplicating the drawing. While STB 615 is shown in FIG. 6 for illustration, any suitable computing device having processing circuitry, control circuitry, and storage may be used in accordance with the present disclosure. For example, STB 615 may be replaced by, or complemented by, a personal computer (e.g., a notebook, a laptop, a desktop), a smartphone (e.g., device 600), a tablet, a network-based server hosting a user-accessible client device, a non-user-owned device, any other suitable device, or any combination thereof.

Control circuitry 604 may be based on any suitable control circuitry such as processing circuitry 606. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for an encoding application stored in memory (e.g., storage 608). Control circuitry 604 may be instructed by the encoding application to perform the functions discussed above and below. In some implementations, processing or actions performed by control circuitry 604 may be based on instructions received from the encoding application.

In client/server-based embodiments, control circuitry 604 may include communications circuitry suitable for communicating with a server or other networks or servers. The encoding application may be a stand-alone application implemented on a device or a server. The encoding application may be implemented as software or a set of executable instructions. The instructions for performing any of the embodiments discussed herein of the encoding application may be encoded on non-transitory computer-readable media (e.g., a hard drive, random-access memory on a DRAM integrated circuit, read-only memory on a BLU-RAY disk, etc.). For example, in FIG. 6, the instructions may be stored in storage 608, and executed by control circuitry 604 of a device 600.

Control circuitry 604 may include communications circuitry suitable for communicating with a server, edge computing systems and devices, a table or database server, or other networks or servers. The instructions for carrying out the aforementioned functionality may be stored on a server (which is described in more detail in connection with FIG. 7). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as encoding application data described above. Nonvolatile memory may also be used (e.g., to launch a boot-up routine and other instructions). Cloud-based storage, described in relation to FIG. 6, may be used to supplement storage 608 or in place of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of user equipment device 600. Control circuitry 604 may also include digital-to-analog converter circuitry and analog-to-digital converter circuitry for converting between digital and analog signals. The tuning and encoding circuitry may be used by user equipment device 600, 601 to receive and to display, to play, or to record content. The tuning and encoding circuitry may also be used to receive video encoding/decoding data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment device 600, the tuning and encoding circuitry (including multiple tuners) may be associated with storage 608.

Control circuitry 604 may receive instruction from a user by way of user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of each one of user equipment device 600 and user equipment device 601. For example, display 612 may be a touchscreen or touch-sensitive display. In such circumstances, user input interface 610 may be integrated with or combined with display 612. In some embodiments, user input interface 610 includes a remote-control device having one or more microphones, buttons, keypads, and any other components configured to receive user input or combinations thereof. For example, user input interface 610 may include a handheld remote-control device having an alphanumeric keypad and option buttons. In a further example, user input interface 610 may include a handheld remote-control device having a microphone and control circuitry configured to receive and identify voice commands and transmit information to STB 615.

Audio output equipment 614 may be integrated with or combined with display 612. Display 612 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 612. Audio output equipment 614 may be provided as integrated with other elements of each one of devices 600 and 601 or may be stand-alone units. An audio component of videos and other content displayed on display 612 may be played through speakers (or headphones) of audio output equipment 614. In some embodiments, audio may be distributed to a receiver, which processes and outputs the audio via speakers of audio output equipment 614. In some embodiments, for example, control circuitry 604 is configured to provide audio cues to a user, or other audio feedback to a user, using speakers of audio output equipment 614. There may be a separate microphone 616 or audio output equipment 614 may include a microphone configured to receive audio input such as voice commands or speech. For example, a user may speak letters or words that are received by the microphone and converted to text by control circuitry 604. In a further example, a user may voice commands that are received by a microphone and recognized by control circuitry 604. Camera 618 may be any suitable video camera integrated with the equipment or externally connected. Camera 618 may be a digital camera comprising a charge-coupled device (CCD) and/or a complementary metal-oxide semiconductor (CMOS) image sensor. Camera 618 may be an analog camera that converts to digital images via a video card.

The encoding application may be implemented using any suitable architecture. For example, it may be a stand-alone application wholly-implemented on each one of user equipment device 600 and user equipment device 601. In such an approach, instructions of the application may be stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to provide encoding/decoding functionality and perform any of the actions discussed herein. Based on the processed instructions, control circuitry 604 may determine what action to perform when input is received from user input interface 610. For example, movement of a cursor on a display up/down may be indicated by the processed instructions when user input interface 610 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the encoding application is a client/server-based application. Data for use by a thick or thin client implemented on each one of user equipment device 600 and user equipment device 601 may be retrieved on-demand by issuing requests to a server remote to each one of user equipment device 600 and user equipment device 601. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on device 600. This way, the processing of the instructions is performed remotely by the server while the resulting displays (e.g., that may include text, a keyboard, or other visuals) are provided locally on device 600. Device 600 may receive inputs from the user via input interface 610 and transmit those inputs to the remote server for processing and generating the corresponding displays. For example, device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to device 600 for presentation to the user.

In some embodiments, the encoding application may be downloaded and interpreted or otherwise run by an interpreter or virtual machine (run by control circuitry 604). In some embodiments, the encoding application may be encoded in the ETV Binary Interchange Format (EBIF), received by control circuitry 604 as part of a suitable feed, and interpreted by a user agent running on control circuitry 604. For example, the encoding application may be an EBIF application. In some embodiments, the encoding application may be defined by a series of JAVA-based files that are received and run by a local virtual machine or other suitable middleware executed by control circuitry 604. In some of such embodiments (e.g., those employing MPEG-2 or other digital media encoding schemes), the encoding application may be, for example, encoded and transmitted in an MPEG-2 object carousel with the MPEG audio and video packets of a program.

FIG. 7 is a diagram of an illustrative system 700 for encoding/decoding content (e.g., XR content, etc.), in accordance with some embodiments of this disclosure. User equipment 720 (e.g., computing devices 721, 722, 723, 724) may be coupled to a communication network 710. The communication network 710 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 710) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the coupled devices may be provided by one or more of these communications paths but are shown as a single path in FIG. 7 to avoid overcomplicating the drawing.

Although communications paths are not drawn between the devices 721-724, these devices may communicate directly with each other via communications paths as well as other short-range, point-to-point communications paths, such as USB cables, IEEE 1394 cables, wireless paths (e.g., Bluetooth, infrared, IEEE 802-11x, etc.), or other short-range communication via wired or wireless paths. The devices 721-724 may also communicate with each other directly through an indirect path via communication network 710.

System 700 may comprise media content source 702, one or more servers 730, and one or more edge servers or edge computing devices 740 (e.g., included as part of an edge computing system). In some embodiments, the encoding application may be executed at one or more of control circuitry 731 of server 730, control circuitry of the devices 721-724, and/or control circuitry 741 of the edge server 740). In some embodiments, data may be stored at database 734 maintained at or otherwise associated with server 730, at storage 743, and/or at storage of one or more of the devices 721-724.

In some embodiments, the server 730 may include control circuitry 731 and storage 733 (e.g., RAM, ROM, Hard Disk, Removable Disk, etc.). Storage 733 may store one or more databases. Server 730 may also include an input/output path 732. I/O path 732 may provide encoding/decoding data, device information, or other data, over a local area network (LAN) or wide area network (WAN), and/or other content and data to control circuitry 731, which may include processing circuitry, and storage 733. Control circuitry 731 may be used to send and receive commands, requests, and other suitable data using I/O path 732, which may comprise I/O circuitry. I/O path 732 may connect control circuitry 731 to one or more communications paths.

Control circuitry 731 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 731 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 731 executes instructions for an emulation system application stored in memory (e.g., the storage 733). Memory may be an electronic storage device provided as storage 733 that is part of control circuitry 731.

Edge server 740 may comprise control circuitry 741, I/O path 742 and storage 743, which may be implemented in a similar manner as control circuitry 731, I/O path 732 and storage 733, respectively of server 730. Edge computing device 740 may be configured to be in communication with one or more of the computing devices 721-724 and server 730 over communication network 710, and may be configured to perform processing tasks (e.g., encoding/decoding) in connection with ongoing processing of video data. In some embodiments, a plurality of edge servers and/or edge computing devices 740 may be strategically located at various geographic locations, and may include mobile edge computing devices configured to provide processing support for mobile devices at various geographical regions.

In some embodiments, the encoding application may be a client/server application where only the client application resides on device 600, and a server application resides on an external server (e.g., server 730 and/or server 740). For example, the encoding application may be implemented partially as a client application on control circuitry 604 of device 600 and partially on server 730 as a server application running on control circuitry 731. Server 730 may be a part of a local area network with one or more of devices 600 or may be part of a cloud computing environment accessed via the internet. In a cloud computing environment, various types of computing services for performing searches on the internet or informational databases, providing encoding/decoding capabilities, providing storage (e.g., for a database) or parsing data (e.g., using machine learning algorithms described above and below) are provided by a collection of network-accessible computing and storage resources (e.g., server 730 and/or edge server 740), referred to as "the cloud." Device 600 may be a cloud client that relies on the cloud computing capabilities from server 730 to determine whether processing (e.g., at least a portion of virtual background processing and/or at least a portion of other processing tasks) should be offloaded from a mobile device and facilitate such offloading. When executed by control circuitry of server 730 or 740, the encoding application may instruct control circuitry 731 or 741 to perform processing tasks for a client device and facilitate the encoding/decoding.

Figure 8:
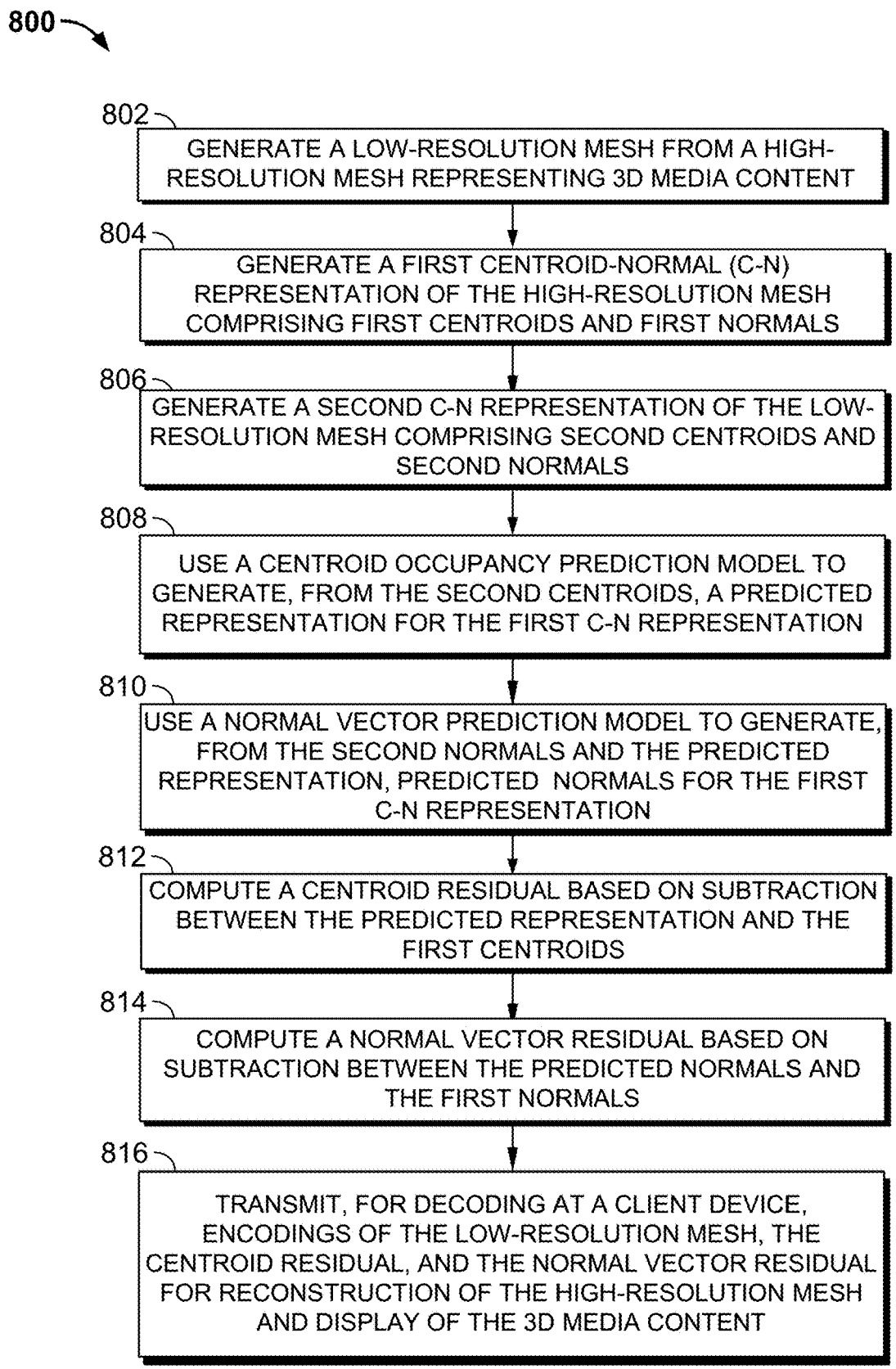
FIG. 8 is a flowchart of a detailed illustrative process for coding 4D content data, in accordance with some embodiments of this disclosure.

FIG. 8 is a flowchart of a detailed illustrative process 800 for coding 4D content data, in accordance with some embodiments of this disclosure. In various embodiments, the individual blocks of process 800 may be implemented via one or more components of the devices and systems of FIGS. 1-7. Although the present disclosure may describe one or more steps of process 800 (and of other processes described herein) as being implemented via specific components of the devices and systems of FIGS. 1-7, this is for purposes of illustration only, and it should be understood that other components of the devices and systems of FIGS. 1-7 may implement those steps. One or more blocks of the process 800 may correspond to one or more components as described regarding FIG. 1.

At block 802, control circuitry generates a low-resolution (lo-res) mesh from a high-resolution (hi-res) mesh representing 3D media content. In some embodiments, each of the lo-res mesh and the hi-res mesh represent other media content (e.g., XR content, content frames, a model of 3D scanned data, other graphic assets, etc.). Each of the lo-res mesh and the hi-res mesh comprises mesh elements having vertices and connections (e.g., a polygon mesh). For example, the control circuitry may execute a mesh simplification algorithm that can generate a lo-res mesh with fewer mesh elements from a hi-res mesh. For example, I/O path 732 and associated circuitry may receive a hi-res mesh from media content source 702 via communication network 710. Control circuitry 731 may generate a simplified lo-res mesh based on the hi-res mesh and/or store the mesh data at the storage 733 and/or the database 734. In some embodiments, the server 730 may instruct the edge server 740 to generate the lo-res mesh via control circuitry 741.

At block 804, control circuitry generates a first C-N representation of the hi-res mesh. The first C-N representation comprises first centroids and first normal vectors (normals). For example, control circuitry 731 may execute a C-N transform based on the vertices and connections of the hi-res mesh to generate the C-N representation 104 having the centroids 106 and the normals 108. At block 806, control circuitry generates a second C-N representation of the lo-res mesh. The second C-N representation comprises second centroids and second normals. For example, control circuitry 731 and/or 741 may execute a C-N transform based on the simplified mesh, which may have fewer mesh elements than the hi-res mesh, to generate the C-N representation 110 having the centroids 112 and the normals 114.

At block 808, control circuitry uses a centroid occupancy prediction model (e.g., the CSR network 122) to generate, from the second centroids, a predicted representation having predicted centroids for the first C-N representation corresponding to the hi-res mesh. The centroid occupancy prediction model may be trained according to a first learning algorithm. For example, control circuitry 731 may input the centroids 112 from the lo-res mesh to the CSR network 122 hosted at the server 730. In some embodiments, the server 730, via I/O path 732 and/or communication network 710, may transmit the C-N data to a second location for accessing the centroid occupancy prediction model (e.g., edge server 740, user equipment 720, etc.). The control circuitry 731 may determine predicted centroids and centroid residuals via the CSR network 122 and input the predicted data to the NSR network 124.

At block 810, control circuitry uses a normal vector prediction model to generate, from the second normal and data of the predicted representation (e.g., the predicted centroids), predicted normals for the first C-N representation corresponding to the hi-res mesh. The normal vector prediction model may be trained according to a second learning algorithm. For example, control circuitry 731 may input the normals 114 of the lo-res mesh and the predicted representation (e.g., predicted centroids, centroid residual) to the NSR network 124 hosted at the server 730. For example, the server 730, via I/O path 732 and/or communication network 710, may transmit the normals 114 and the predicted representation to a second location for accessing the normal vector prediction model (e.g., edge server 740, user equipment 720, etc.). Control circuitry 731 may determine the predicted normals and normal vector residual via the NSR network 124.

In some embodiments, at block 812, control circuitry may compute a centroid residual between the predicted centroids and the first centroids of the first C-N representation corresponding to the hi-res mesh. For example, the centroid residual may comprise centroid errors. The centroid errors may be differences between the predicted centroids and the first centroids (e.g., via subtraction of the corresponding centroids). Control circuitry may generate a data structure (e.g., a matrix) comprising the centroid residual.

In some embodiments, at block 814, control circuitry computes a normal vector residual between the predicted normals and the first normals of the first C-N representation corresponding to the hi-res mesh. For example, the normal vector residual may comprise normal vector errors. The normal vector errors may include differences between the predicted normals and the first normals. Control circuitry may generate a data structure (e.g., a matrix) comprising the normal vector residual.

At block 816, control circuitry, and/or input/output circuitry (e.g., I/O path 732), generates and transmits (e.g., over a network) encodings of the lo-res mesh, the centroid residual, and the normal vector residual. Examples of a network may include communication network 710, a local network (e.g., between user equipment devices 600 and 601), a virtual network (e.g., a virtual private network, virtual LAN, VXLAN), etc. For example, control circuitry 731 may generate an encoding of the second C-N representation comprising the second centroids and the second normals. In this example, I/O circuitry, via I/O path 732, may transmit the encodings to a receiving device (e.g., edge server 740, user equipment 720, STB 615, etc.) via communication network 710. In a second non-limiting example, control circuitry 741 may generate an encoding of the lo-res mesh comprising corresponding vertices and connections. In this example, I/O circuitry, via I/O path 742, may transmit the encoding to a receiving device (e.g., device 723, device 600, STB 615, etc.) via communication network 710. The receiving device may decode the encoding of the lo-res mesh and generate a C-N representation based on vertices and connections of the lo-res mesh. Control circuitry may generate and transmit, via I/O circuitry, bitstreams of the encodings to a receiving device over a communication network for reconstructing the hi-res mesh and for generating the 3D media content for display at the receiving device. For example, media content source 702 or edge server 740 may receive the bitstreams and transmit the coded mesh and residual data to a receiving device (e.g., a decoder, a second edge server, a CDN, any of computing devices 721-724, etc.). As described regarding FIGS. 2 and 9, the receiving device may decode the bitstreams to recover the mesh geometry information and reconstruct a predicted hi-res mesh. The receiving device may generate for display the 3D media content based on the predicted hi-res mesh.

Figure 9:
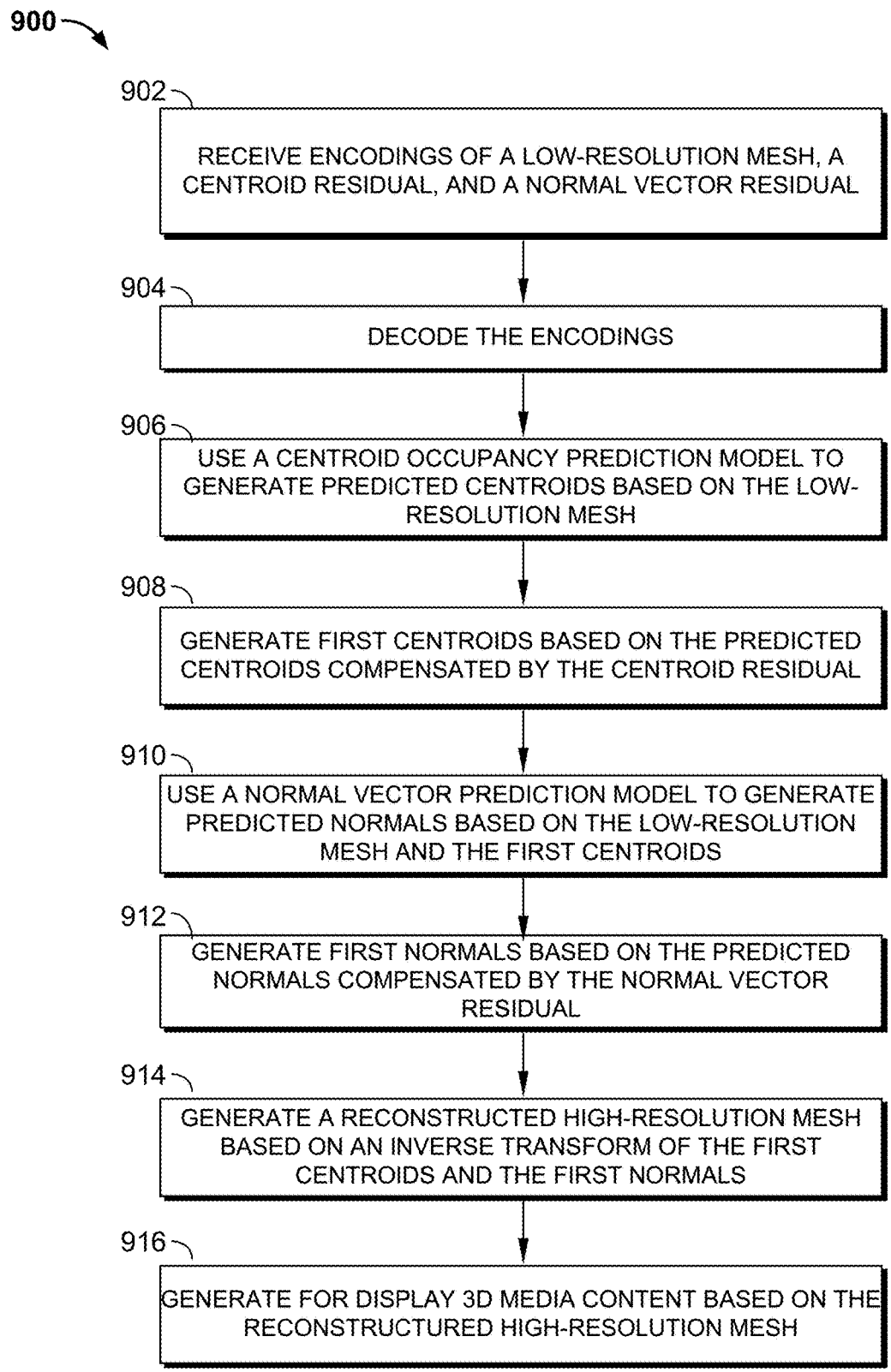
FIG. 9 is a flowchart of a detailed illustrative process for decoding 4D content data, in accordance with some embodiments of this disclosure.

FIG. 9 is a flowchart of a detailed illustrative process 900 for decoding 4D content data, in accordance with some embodiments of this disclosure. In various embodiments, the individual blocks of process 900 may be implemented at one or more components of the devices and systems of FIGS. 1-7. Although the present disclosure may describe one or more steps of process 900 (and of other processes described herein) as being implemented by specific components of the devices and systems of FIGS. 1-7, this is for purposes of illustration only, and it should be understood that other components of the devices and systems of FIGS. 1-7 may implement those steps. One or more blocks of the process 900 may correspond to one or more components as described regarding FIG. 2.

At block 902, control circuitry receives encodings of a lo-res mesh, a centroid residual, and a normal vector residual. For example, I/O path 742 may receive the encoded bitstreams of the aforementioned data. For example, a content decoder (e.g., decoders 204, 206 or STB 615) coupled to the computing device 723 may receive the encoded bitstreams. In a second non-limiting example, the computing device 724 may receive the encoded bitstreams. At block 904, control circuitry decodes the encoded data to recover the lo-res mesh, the centroid residual, and the normal vector residual. For example, control circuitry 741 may utilize a mesh geometry coding tool such as Draco to decode one or more of the bitstreams. Control circuitry 741 may store the decoded data (e.g., mesh geometry information of the lo-res mesh, centroid residual, etc.) in the storage 743 or at a remote database (e.g., media content source 702).

At block 906, control circuitry uses a centroid occupancy prediction model to generate a predicted representation comprising predicted centroids based on the lo-res mesh. For example, if the decoded mesh geometry information comprises centroids and normals of the lo-res mesh, the control circuitry 741 may input the centroids and normals to a CSR network (e.g., CSR network 208). The control circuitry 741, via the CSR network, generates predicted centroids corresponding to a target hi-res mesh (e.g., the C-N representation 104). In a second example, if the decoded mesh geometry information comprises vertices and connection of the lo-res mesh, the control circuitry (e.g., at user equipment 720) may transmit a request to a remote device hosting a prediction model to generate predicted centroids based on the decoded mesh geometry information. The remote device may generate centroids based on the vertices and connection of the lo-res mesh and determine predicted centroids as described regarding FIG. 2. In some embodiments, the predicted centroids and/or centroid residual may be transmitted to a device for reconstruction.

At block 908, control circuitry may generate first centroids, (e.g., reconstructed centroids) based on the predicted centroids compensated by the centroid residual. The first centroids correspond to the target hi-res mesh (e.g., one centroid per mesh element of the hi-res mesh). For example, processing circuitry at the STB 615 may receive the predicted centroids and the centroid residual. In this example, the STB 615 may determine the reconstructed centroids by summing the predicted centroids and the centroid residual. At block 910, control circuitry uses a normal vector prediction model to generate predicted normals based on the lo-res mesh (e.g., the normal vectors) and the first centroids. For example, control circuitry 741 may receive the decoded mesh geometry information of a lo-res mesh and access the normal vectors from the mesh geometry information. The normal vector information may comprise at least two angles ($\alpha$, $\beta$) per mesh element of the lo-res mesh, wherein the angles indicate the direction perpendicular to the mesh element starting from the centroid. Control circuitry 741, via the normal vector prediction model, determines the predicted normals at the first centroids corresponding to the target hi-res mesh. In some embodiments, control circuitry may determine an angle by estimating a feature value for a point cloud feature using the normal vector prediction model (e.g., estimating a color value).

At block 912, control circuitry generates first normals (e.g., reconstructed normals) based on the predicted normals compensated by the normal vector residual. The first normals correspond to the target hi-res mesh (e.g., one normal vector at the one centroid per mesh element of the hi-res mesh). For example, control circuitry 741 may receive the predicted normals and the normal vector residual. In this example, edge server 740 may determine the reconstructed normals by summing the predicted normals and the normal vector residual. At block 914, control circuitry (e.g., at edge server 740) may generate a reconstructed hi-res mesh based on an inverse transform of the first centroids and the first normals. In some embodiments, control circuitry may store a reconstructed C-N representation (e.g., the first centroids and the first normals) at a content database (e.g., database 734, storage 743, media content source 702, etc.). The reconstructed C-N representation may be transmitted (e.g., via communication network 710) to a client device in response to receiving a request for content. Additionally, or alternatively, control circuitry may generate a hi-res mesh based on the reconstructed C-N representation and transmit the hi-res mesh in response to receiving the request for content.

At block 916, control circuitry generates for display 3D media content based on the reconstructed hi-res mesh. For example, a media device (e.g., STB 615) may receive the reconstructed mesh data and generate for display, via associated display circuitry, the 3D media content. For example, display circuitry at edge server 740 may generate for display the 3D media content (e.g., video frames, etc.) based on the reconstructed mesh data and transmit the 3D media content for display at user equipment 720. Display circuitry (e.g., as part of display 612) at user equipment 720 may display the 3D media content.

Figure 10:
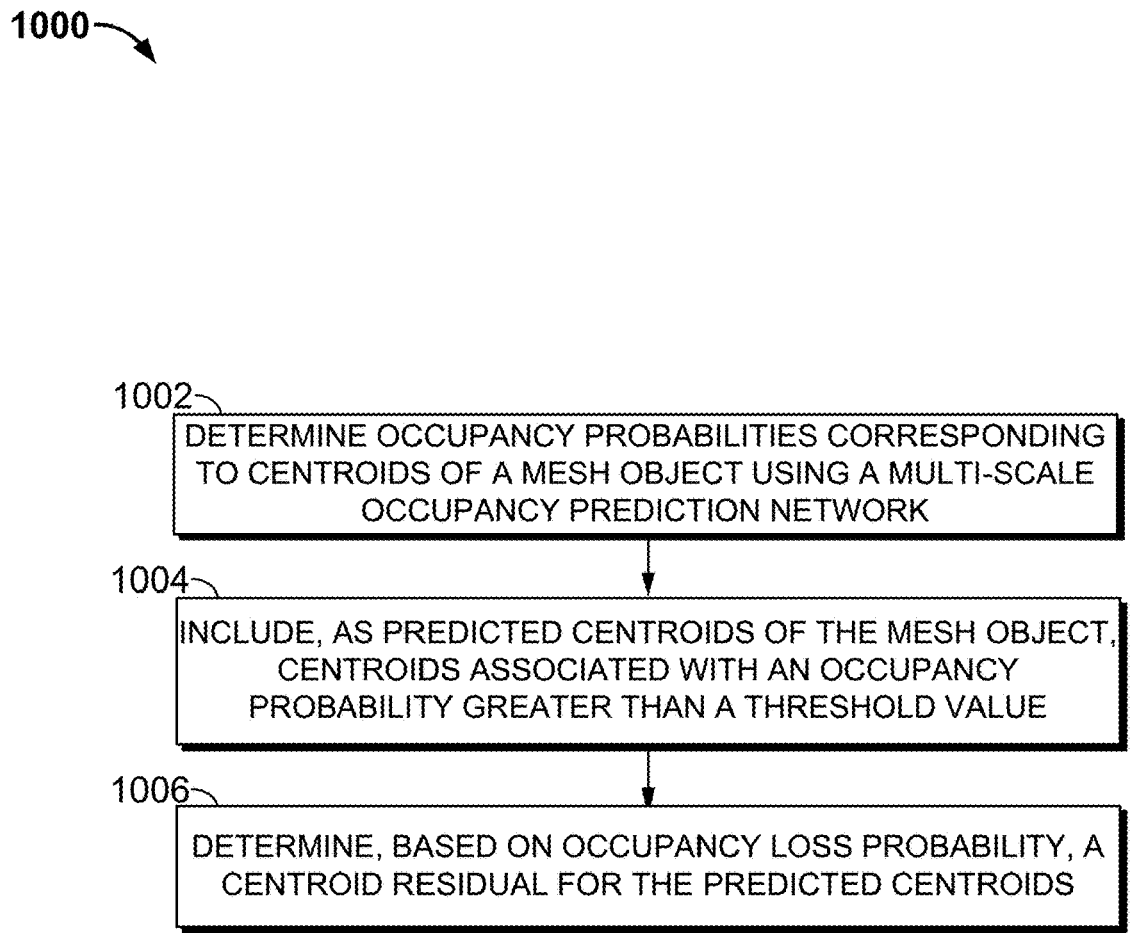
FIG. 10 is a flowchart of a detailed illustrative process for generating predicted centroids representing a high-resolution mesh object, in accordance with some embodiments of this disclosure.

FIG. 10 is a flowchart of a detailed illustrative process 1000 for generating predicted centroids representing a high-resolution mesh object, in accordance with some embodiments of this disclosure. In various embodiments, the individual steps of process 1000 may be implemented by one or more components of the devices and systems of FIGS. 1-7. Although the present disclosure may describe certain steps of process 1000 (and of other processes described herein) as being implemented by certain components of the devices and systems of FIGS. 1-7, this is for purposes of illustration only, and it should be understood that other components of the devices and systems of FIGS. 1-7 may implement those steps. In some embodiments, the process 1000 may correspond to one or more blocks of the processes 800, 900. For example, the process 1000 may be partially or wholly implemented at a system configured to perform block 808 (e.g., an encoder) and/or 906 (e.g., a decoder).

At block 1002, control circuitry determines occupancy probabilities corresponding to centroids of a mesh object using a multi-scale occupancy prediction network (e.g., based on the model 400 of FIG. 4). For example, a mesh object may be a mesh object cube of size 10-bit, corresponding to $N=(2^{10})^3$, or 1,073,741,824 vertices. The mesh object may be a 3D structure defining one or more potential centroids for a target hi-res mesh.

At block 1004, control circuitry includes, as predicted centroids of the mesh object, the centroids associated with an occupancy probability greater than a threshold value. For example, control circuitry 731 may compare the probability of occupancy for each potential centroid to a threshold value. Based on the probability being greater than the threshold value, the control circuitry 731 may select the centroid as a predicted centroid of the mesh object. At block 1006, control circuitry determines, based on a loss metric (e.g., an occupancy loss probability), a centroid residual for the predicted centroids. For example, control circuitry 731 may compute a cross-entropy loss based on the determined occupancy probabilities.

Figure 11:
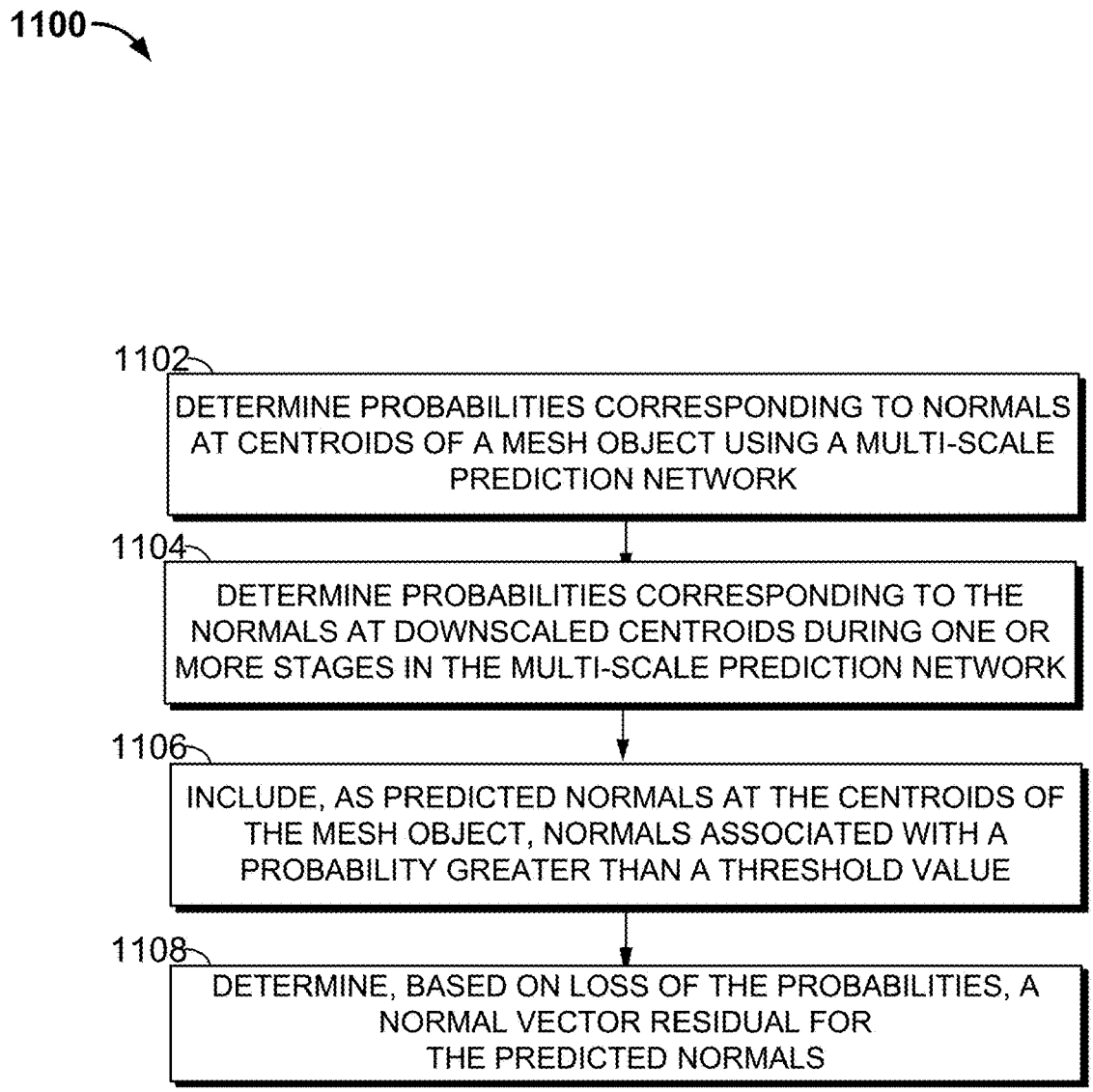
FIG. 11 is a flowchart of a detailed illustrative process for generating predicted normal vectors at centroids representing a high-resolution mesh object, in accordance with some embodiments of this disclosure.

FIG. 11 is a flowchart of a detailed illustrative process 1100 for generating predicted normal vectors at centroids representing a mesh object (e.g., a hi-res mesh object), in accordance with some embodiments of this disclosure. In various embodiments, the individual steps of process 1100 may be implemented by one or more components of the devices and systems of FIGS. 1-7. Although the present disclosure may describe certain steps of process 1100 (and of other processes described herein) as being implemented by certain components of the devices and systems of FIGS. 1-7, this is for purposes of illustration only, and it should be understood that other components of the devices and systems of FIGS. 1-7 may implement those steps. In some embodiments, the process 1100 may correspond to one or more blocks of the processes 800, 900. For example, the process 1100 may be partially or wholly implemented at a system configured to perform block 810 (e.g., an encoder) and/or 910 (e.g., a decoder).

At block 1102, control circuitry computes probabilities corresponding to normals at a first plurality of centroids of a mesh object using a multi-scale prediction network (e.g., the model 500). For example, the probability of a matching angle may be computed for each occupied centroid of a mesh object. The mesh object may be a multi-dimensional structure defining one or more potential angles for a target hi-res mesh. For example, control circuitry 731 may determine probabilities for a plurality of candidate first angles, the probabilities indicating whether a candidate first angle is a match for a normal at the occupied centroid. In an analogous manner, control circuitry 731 may determine probabilities that a candidate second angle is a match for a normal at the occupied centroid. Referring to FIG. 5 for illustration, control circuitry may determine first probabilities for the normals at the first plurality of centroids input to the contraction group 514.

At block 1104, control circuitry determines probabilities corresponding to the normals at a plurality of downscaled centroids during one or more stages in the multi-scale prediction network. For example, control circuitry 731 may generate second and third pluralities of centroids based on a downscaled version of the first plurality of centroids. Control circuitry 731 may generate the second plurality of centroids using a Stride-2 downscaling layer (e.g., comprising the block 330). In some embodiments, control circuitry 731 may generate the second plurality of centroids using an expansion group (e.g., group 406) of a multi-scale prediction model. In an analogous manner, control circuitry 731 may generate the third plurality of centroids using the Stride-2 downscaling layer or the expansion group. Referring to FIG. 5 for illustration, control circuitry may determine second probabilities for the normals at the second plurality of centroids input to the contraction group 510. Control circuitry may determine third probabilities for the normals at the third plurality of centroids input to the contraction group 512.

At block 1106, control circuitry includes, as the predicted normals at the centroids of the mesh object, normals associated with a corresponding probability greater than a threshold value. The threshold value for predicted normals may be different than the threshold value for predicted centroids. For example, control circuitry 731 may compare the probability for each potential angle to a threshold value. Based on the probability being greater than the threshold value, the control circuitry 731 may select the angle as a predicted normal vector angle. In some embodiments, control circuitry may select two or more angles as a candidate group for a predicted normal based on comparing an overall probability (e.g., an average probability based on probabilities of the two or more angles) to the threshold value. For example, control circuitry 731 may compare an overall probability for a pair of candidate angles to the threshold value. If the overall probability is greater than the threshold value, control circuitry 731 may select the pair of candidate angles as a predicted normal. In some embodiments, control circuitry may generate one or more combinations of angles as candidate groups with associated probabilities. At block 1108, control circuitry determines, based on a loss metric (e.g., a complement to a probability), a normal vector residual for the predicted normals. For example, control circuitry 731 may compute a cross-entropy loss based on the determined probabilities of predicted normals at the first, second, and third pluralities of centroids.

The processes discussed above are intended to be illustrative and not limiting. One skilled in the art would appreciate that the steps of the processes discussed herein may be omitted, modified, combined and/or rearranged, and any additional steps may be performed without departing from the scope of the present disclosure. More generally, the above disclosure is meant to be illustrative and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   generating a low-resolution mesh from a high-resolution mesh, each of the low-resolution mesh and the high-resolution mesh representing a same media content;
   generating a first centroid-normal representation of the high-resolution mesh, the first centroid-normal representation comprising a first plurality of centroids and a first plurality of normal vectors;
   generating a second centroid-normal representation of the low-resolution mesh, the second centroid-normal representation comprising a second plurality of centroids and second plurality of normal vectors;
   using a centroid occupancy prediction model to generate, from the second plurality of centroids, a predicted representation corresponding to the first centroid-normal representation, wherein the centroid occupancy prediction model is trained according to a first learning algorithm;
   using a normal vector prediction model to generate, from the second plurality of normal vectors and the predicted representation, predicted normal vectors corresponding to the first centroid-normal representation, wherein the normal vector prediction model is trained according to a second learning algorithm;
   computing a centroid residual based on a difference between centroids of the predicted representation and the first plurality of centroids;
   computing a normal vector residual based on a difference between the predicted normal vectors and the first plurality of normal vectors; and
   transmitting, for decoding at a client device, encodings of the low-resolution mesh, the centroid residual, and the normal vector residual for reconstruction of the high-resolution mesh and display of the same media content.

2. The method of claim 1, wherein the generating the first centroid-normal representation comprises:
   accessing a first data structure comprising a plurality of mesh elements for the high-resolution mesh, each mesh element comprising a respective plurality of vertices;
   for each mesh element of the plurality of mesh elements:
      computing a respective centroid of the respective plurality of vertices of the mesh element; and
      computing a respective normal vector based on the respective plurality of vertices of the mesh element, wherein the respective normal vector is perpendicular to the mesh element at the respective centroid, and wherein the respective normal vector is one of the first plurality of normal vectors; and
   generating a second data structure associated with the first centroid-normal representation, wherein the second data structure comprises the first plurality of centroids and the first plurality of normal vectors.

3. The method of claim 2, wherein the computing the respective normal vector based on the respective plurality of vertices of each mesh element of the plurality of mesh elements comprises:
   determining a first angle and a second angle corresponding to the respective normal vector, wherein the first angle and the second angle collectively define a spatial direction that is perpendicular to the mesh element at the respective centroid, and wherein the second data structure comprises the first angle and the second angle for the respective normal vector based on the respective plurality of vertices of each mesh element of the plurality of mesh elements.

4. The method of claim 1, wherein the using the centroid occupancy prediction model to generate the predicted representation comprises:
   computing a probability of occupancy for centroids of a mesh object, wherein the mesh object is a 3D structure defining potential centroids for the first centroid-normal representation;
   comparing the probability of occupancy to a threshold value; and
   assigning, as part of the predicted representation, centroids of the mesh object associated with a probability of occupancy greater than the threshold value.

5. The method of claim 4, further comprising determining centroid errors for the predicted representation based on a binary cross-entropy loss.

6. The method of claim 1, wherein the using the centroid occupancy prediction model to generate the predicted representation further comprises determining initial feature channels by using a 3D convolution model.

7. The method of claim 6, wherein the 3D convolution model comprises a Minkowski convolutional neural network model.

8. The method of claim 1, wherein the same media content comprises at least one of a 3D scanned model of a physical object or an animated digital object.

9. The method of claim 1, wherein the normal vector prediction model comprises a 3D convolution model.

10. The method of claim 9, wherein the using the normal vector prediction model further comprises:
    using the 3D convolution model to generate initial feature channels;
    using a first plurality of Multi-Resolution Convolution Blocks (MRCBs) and Stride-2 downscaling convolution layers to generate expanded feature channels based on the initial feature channels;
    inputting, in a second plurality of MRCBs and Stride-2 upscaling convolution layers, the expanded feature channels and a plurality of centroids having respective resolution scales for the Stride-2 upscaling convolution layers; and generating, from the second plurality of MRCBs and Stride-2 upscaling convolution layers, output feature channels based on the expanded feature channels and the plurality of centroids having the respective resolution scales.

11. A system comprising:
control circuitry configured to:
  generate a low-resolution mesh from a high-resolution mesh, each of the low-resolution mesh and the high-resolution mesh representing a same media content;
  generate a first centroid-normal representation of the high-resolution mesh comprising a first plurality of centroids and a first plurality of normal vectors;
  generate a second centroid-normal representation of the low-resolution mesh comprising a second plurality of centroids and second plurality of normal vectors;
  use a centroid occupancy prediction model to generate, from the second plurality of centroids, a predicted representation corresponding to the first centroid-normal representation, wherein the centroid occupancy prediction model is trained according to a first learning algorithm;
  use a normal vector prediction model to generate, from the second plurality of normal vectors and the predicted representation, predicted normal vectors corresponding to the first centroid-normal representation, wherein the normal vector prediction model is trained according to a second learning algorithm;
  compute a centroid residual based on a difference between centroids of the predicted representation and the first plurality of centroids;
  compute a normal vector residual based on a difference between the predicted normal vectors and the first plurality of normal vectors; and
input/output (I/O) circuitry configured to:
  transmit, for decoding at a client device, encodings of the low-resolution mesh, the centroid residual, and the normal vector residual for reconstruction of the high-resolution mesh and display of the same media content.

12. The system of claim 11, wherein the control circuitry, when generating the first centroid-normal representation, is configured to:
  access a first data structure comprising a plurality of mesh elements for the high-resolution mesh, each mesh element comprising a respective plurality of vertices;
  for each mesh element of the plurality of mesh elements:
    compute a respective centroid of the respective plurality of vertices of the mesh element; and
    compute a respective normal vector based on the respective plurality of vertices of the mesh element, wherein the respective normal vector is perpendicular to the mesh element at the respective centroid, and wherein the respective normal vector is one of the first plurality of normal vectors; and
  generate a second data structure associated with the first centroid-normal representation, wherein the second data structure comprises the first plurality of centroids and the first plurality of normal vectors.

13. The system of claim 12, wherein the control circuitry, when computing the respective normal vector based on the respective plurality of vertices of each mesh element of the plurality of mesh elements, is configured to:
  determine a first angle and a second angle corresponding to the respective normal vector, wherein the first angle and the second angle collectively define a spatial direction that is perpendicular to the mesh element at the respective centroid, and wherein the second data structure comprises the first angle and the second angle for the respective normal vector based on the respective plurality of vertices of each mesh element of the plurality of mesh elements.

14. The system of claim 11, wherein the control circuitry, when using the centroid occupancy prediction model to generate the predicted representation, is configured to:
  compute a probability of occupancy for centroids of a mesh object, wherein the mesh object is a 3D structure defining potential centroids for the first centroid-normal representation;
  compare the probability of occupancy to a threshold value; and
  assign, as part of the predicted representation, centroids of the mesh object associated with a probability of occupancy greater than the threshold value.

15. The system of claim 14, wherein the control circuitry is further configured to:
  determine centroid errors for the predicted representation based on a binary cross-entropy loss.

16. The system of claim 11, wherein the control circuitry, when using the centroid occupancy prediction model to generate the predicted representation, is configured to determine initial feature channels by using a 3D convolution model.

17. The system of claim 16, wherein the 3D convolution model comprises a Minkowski convolutional neural network model.

18. The system of claim 11, wherein the same media content comprises at least one of a 3D scanned model of a physical object or an animated digital object.

19. The system of claim 11, wherein the normal vector prediction model comprises a 3D convolution model.

20. The system of claim 19, wherein the control circuitry, when using the normal vector prediction model, is configured to:
  use the 3D convolution model to generate initial feature channels;
  use a first plurality of Multi-Resolution Convolution Blocks (MRCBs) and Stride-2 downscaling convolution layers to generate expanded feature channels based on the initial feature channels;
  input, in a second plurality of MRCBs and Stride-2 upscaling convolution layers, the expanded feature channels and a plurality of centroids having respective resolution scales for the Stride-2 upscaling convolution layers; and
  generate, from the second plurality of MRCBs and Stride-2 upscaling convolution layers, output feature channels based on the expanded feature channels and the plurality of centroids having the respective resolution scales.

* * * * *